US012668481B2

(12) United States Patent
Garza et al.

(10) Patent No.: US 12,668,481 B2
(45) Date of Patent: Jun. 30, 2026

(54) ON-DEMAND COOLING SYSTEM FOR A BEVERAGE DISPENSER

(71) Applicant: LANCER CORPORATION, San Antonio, TX (US)

(72) Inventors: Hector Huerta Garza, San Antonio, TX (US); Anthony J. Behe, Jr., Converse, TX (US)

(73) Assignee: Lancer Corporation, San Antonio, TX (US)

( * ) Notice: Subject to any disclaimer, the term of this patent is extended or adjusted under 35 U.S.C. 154(b) by 142 days.

(21) Appl. No.: 18/886,186

(22) Filed: Sep. 16, 2024

(65) Prior Publication Data

US 2026/0077993 A1 Mar. 19, 2026

(51) Int. Cl.
*B67D 1/08* (2006.01)

(52) U.S. Cl.
CPC ......... *B67D 1/0864* (2013.01); *B67D 1/0867* (2013.01); *B67D 1/0888* (2013.01); *B67D 2210/00104* (2013.01)

(58) Field of Classification Search
CPC ........ B67D 2210/00104; B67D 1/0888; B67D 1/0867; B67D 1/0864
USPC ........................................................ 222/146.6
See application file for complete search history.

(56) References Cited

U.S. PATENT DOCUMENTS

| | | | | |
|---|---|---|---|---|
| 3,786,648 A | 1/1974 | Rice | | |
| 2008/0210408 A1* | 9/2008 | Sterngold | ............ B67D 1/1422 165/104.31 | |

FOREIGN PATENT DOCUMENTS

| | | | | |
|---|---|---|---|---|
| JP | 2011031918 A * | 2/2011 | | |
| KR | 101383024 B1 * | 4/2014 | ............. C02F 1/003 | |
| KR | 1013832024 B1 | 8/2014 | | |
| KR | 20190101166 A | 8/2019 | | |
| KR | 20240044123 A * | 4/2024 | ........... B67D 1/0801 | |

OTHER PUBLICATIONS

Machine Translation of JP-2011031918-A.*
Machine Translation of KR-101383024-B1.*
Machine translation of KR-20240044123-A.*
International Search Report and Written Opinion for PCT/US2025/046111, Sep. 12, 2025, PCT Application Counterpart to U.S. Appl. No. 18/886,186.

* cited by examiner

*Primary Examiner* — Jeremy Carroll
(74) *Attorney, Agent, or Firm* — Christopher L. Makay

(57) ABSTRACT

An on-demand cooling system for a beverage dispenser includes a cooling enclosure, a first cooling chamber, a second cooling chamber, and a refrigeration system communicating with the cooling enclosure, the first cooling chamber, and the second cooling chamber. The cooling enclosure receives water therethrough from a water source or a recirculation system. The refrigeration system chills the water flowing through the cooling enclosure prior to the water exiting the cooling enclosure into the first cooling chamber. The refrigeration system chills the water within the first cooling chamber prior to the water exiting the first cooling chamber into the second cooling chamber. The refrigeration system chills the water within the second cooling chamber, thereby providing chilled water for the beverage dispenser.

40 Claims, 7 Drawing Sheets

ON-DEMAND COOLING SYSTEM FOR A BEVERAGE DISPENSER

BACKGROUND OF THE INVENTION

1. Field of the Invention

The present invention relates to beverage dispensing and, more particularly, but not by way of limitation, to an on-demand cooling system for a beverage dispenser, such as, for example, a post-mix type beverage dispenser.

2. Description of the Related Art

A beverage dispenser of a post-mix type frequently includes a housing defining a cooling tank that receives therein a cooling fluid, usually water. The housing includes at least one product valve connected to a product line located in the cooling tank and coupled with a product source and at least one diluent valve connected to a diluent line located in the cooling tank and coupled with a diluent source, such as, for example a source of plain water or carbonated water. The product valve and the diluent valve respectively receive the product and the diluent and then deliver the product and the diluent to a dispensing nozzle supported on the housing of the beverage dispenser. The dispensing nozzle mixes the product and diluent to produce a beverage for dispensing from the beverage dispenser. In order to facilitate a cooling of the product and the diluent, the beverage dispenser includes an electrically operated refrigeration system that interfaces with the cooling tank such that the refrigeration system forms in the cooling tank a solid bank of cooling fluid through freezing a portion of the cooling fluid. The beverage dispenser further includes an agitator that circulates the cooling fluid about the product line, the diluent line, and the solid bank of cooling fluid, resulting in a cooling of the product and the diluent to a temperature below a desired temperature (normally at least 40° F./4.4° C.) prior to a dispensing thereof from the dispensing valve as a beverage.

Although the solid bank of cooling fluid formed within the cooling tank of a beverage dispenser by its refrigeration system adequately promotes a heat energy transfer that results in the cooling of the product and the diluent to at or below the desired temperature prior to their dispensing, there are disadvantages to using a refrigeration system produced solid bank of cooling fluid. With counterspace and the value thereof at a premium, a beverage dispenser is desirably small and compact, and any increase in beverage dispenser size and weight is undesirable. The cooling capacity of a beverage dispenser and its ability to consistently dispense a beverage at or below the desired temperature despite frequent use of the beverage dispenser over extended periods of time depends upon the size and shape of the solid bank of cooling fluid, which is limited by the size, weight, and component considerations of the beverage dispenser including its refrigeration system. Unfortunately, the refrigeration system required to produce a sufficiently sized and shaped solid bank of cooling fluid within the cooling tank of the beverage dispenser necessarily includes large components that detrimentally increase the size and weight of the beverage dispenser. Moreover, certain refrigeration system components, such as, for example, a control switch employed in developing the solid bank of cooling fluid with respect to its size and shape, often are unreliable resulting in a misshapen solid bank of cooling fluid that diminishes the cooling capacity of the beverage dispenser. In addition, a solid bank of cooling fluid regardless of its size and shape experiences a constant and wasteful absorption of ambient heat energy that leads to an increase in beverage dispenser power consumption. Still further, any time the beverage dispenser is installed and started or restarted, there is an extensive start up period and cooling fluid temperature pulldown process due to the multiple hours required to establish a solid bank of cooling fluid.

Accordingly, an on-demand cooling system for a beverage dispenser that maintains a desired beverage dispensing capacity and capability while operating without a solid bank of cooling fluid and further advantageously reduces beverage dispenser size and weight, eliminates unreliable components, lessens beverage dispenser power consumption, and substantially decreases beverage dispenser start up time will provide an improvement in beverage dispensing.

SUMMARY OF THE INVENTION

In accordance with the present invention, an on-demand cooling system for a beverage dispenser includes a cooling enclosure, a first cooling chamber, a second cooling chamber, and a refrigeration system communicating with the cooling enclosure, the first cooling chamber, and the second cooling chamber. The cooling enclosure is configured to receive water therethrough from a water source or a recirculation system such that the refrigeration system chills the water flowing through the cooling enclosure prior to the water exiting the cooling enclosure. The first cooling chamber is configured to receive chilled water flowing from the cooling enclosure such that the refrigeration system chills the water within the first cooling chamber prior to the water exiting the first cooling chamber. The second cooling chamber is configured to receive chilled water flowing from the first cooling chamber such that the refrigeration system chills the water within the second cooling chamber, thereby providing chilled water for the beverage dispenser. The cooling enclosure in a preferred embodiment is located within the first cooling chamber.

The refrigeration system includes a first evaporator zone, a second evaporator zone, a third evaporator zone, and a refrigeration unit configured to circulate a refrigerant through the first evaporator zone, the second evaporator zone, and the third evaporator zone. The cooling enclosure is disposed about the first evaporator zone such that the first evaporator zone chills the water flowing through the cooling enclosure prior to the water exiting the cooling enclosure. More particularly, the cooling enclosure encases the first evaporator zone such that the water flowing through the cooling enclosure directly contacts the first evaporator zone thereby enhancing heat transfer between the water and the first evaporator zone. The first cooling chamber includes the second evaporator zone therein such that the second evaporator zone chills the water within the first cooling chamber prior to the water exiting the first cooling chamber. The second cooling chamber includes the third evaporator zone therein such that the third evaporator zone chills the water within the second cooling chamber.

The first evaporator zone communicates with the second evaporator zone while the second evaporator zone communicates with the third evaporator zone. The refrigeration unit accordingly is configured to deliver the refrigerant to the first evaporator zone for flow consecutively through the first evaporator zone, the second evaporator zone, and the third evaporator zone before return from the third evaporator zone to the refrigeration unit. In an alternative, the refrigeration unit is configured to deliver the refrigerant to each of the first evaporator zone, the second evaporator zone, and the third evaporator zone before return to the refrigeration unit from each of the first evaporator zone, the second evaporator zone, and the third evaporator zone.

The recirculation system is configured to remove water from the second cooling chamber and deliver the water to the cooling enclosure. Responsive to the delivery of water into the cooling enclosure, the refrigeration unit circulates the refrigerant through the first evaporator zone, the second evaporator zone, and the third evaporator zone. In accordance therewith, the first evaporator zone chills the water flowing through the cooling enclosure prior to the water exiting the cooling enclosure into the first cooling chamber, the second evaporator zone chills the water within the first cooling chamber prior to the water exiting the first cooling chamber into the second cooling chamber, and the third evaporator zone chills the water within the second cooling chamber, thereby maintaining chilled water for the beverage dispenser.

An evaporator coil implements the first evaporator zone, the second evaporator zone, and the third evaporator zone. The evaporator coil traverses the cooling enclosure to form the first evaporator zone, the first cooling chamber to form the second evaporator zone, and the second cooling chamber to form the third evaporator zone. The refrigeration unit communicates with the evaporator coil such that the refrigeration unit circulates the refrigerant through the evaporator coil. The evaporator coil responsive to the circulating refrigerant chills the water flowing through the cooling enclosure prior to the water exiting the cooling enclosure into the first cooling chamber, the water within the first cooling chamber prior to the water exiting the first cooling chamber into the second cooling chamber, and the water within the second cooling chamber, thereby providing chilled water for the beverage dispenser.

In one configuration, a first evaporator coil implements the first evaporator zone and the second evaporator zone and a second evaporator coil connected with the first evaporator coil implements the third evaporator zone. The first evaporator coil, which includes at least a first evaporator coil segment and a second evaporator coil segment, traverses the first cooling chamber. The cooling enclosure encases the first evaporator coil segment therein such that the first evaporator coil segment forms the first evaporator zone within the cooling enclosure. The second evaporator coil segment forms the second evaporator zone within the first cooling chamber. The second evaporator coil traverses the second cooling chamber such that the second evaporator coil forms the third evaporator zone within the second cooling chamber. The refrigeration unit communicates with the first evaporator coil and the second evaporator coil in order to circulate the refrigerant through the first evaporator coil and the second evaporator coil. The first evaporator coil segment responsive to the circulating refrigerant chills the water flowing through the cooling enclosure prior to the water exiting the cooling enclosure into the first cooling chamber. The second evaporator coil segment responsive to the circulating refrigerant chills the water within the first cooling chamber prior to the water exiting the first cooling chamber into the second cooling chamber. The second evaporator coil responsive to the circulating refrigerant chills the water within the second cooling chamber, thereby providing chilled water for the beverage dispenser.

In another configuration, a first evaporator coil implements the cooling enclosure, a second evaporator coil connected with the first evaporator coil implements the second evaporator zone, and a third evaporator coil connected with the second evaporator coil implements the third evaporator zone. The first evaporator coil traverses the cooling enclosure such that the first evaporator coil forms the first evaporator zone within the cooling enclosure. The second evaporator coil traverses the first cooling chamber such that the second evaporator coil forms the second evaporator zone within the first cooling chamber. The third evaporator coil traverses the second cooling chamber such that the third evaporator coil forms the third evaporator zone within the second cooling chamber. The refrigeration unit communicates with the first evaporator coil, the second evaporator coil, and the third evaporator coil in order to circulate the refrigerant through the first evaporator coil, the second evaporator coil, and the third evaporator coil. The first evaporator coil responsive to the circulating refrigerant chills the water flowing through the cooling enclosure prior to the water exiting the cooling enclosure into the first cooling chamber. The second evaporator coil responsive to the circulating refrigerant chills the water within the first cooling chamber prior to the water exiting the first cooling chamber into the second cooling chamber. The third evaporator coil responsive to the circulating refrigerant chills the water within the second cooling chamber, thereby providing chilled water for the beverage dispenser.

In still another configuration, a first evaporator coil connected with the refrigeration unit implements the first evaporator zone, a second evaporator coil connected with the refrigeration unit implements the second evaporator zone, and a third evaporator coil connected with the refrigeration unit implements the third evaporator zone. The first evaporator coil traverses the cooling enclosure such that the first evaporator coil forms the first evaporator zone within the cooling enclosure. The second evaporator coil traverses the first cooling chamber such that the second evaporator coil forms the second evaporator zone within the first cooling chamber. The third evaporator coil traverses the second cooling chamber such that the third evaporator coil forms the third evaporator zone within the second cooling chamber. The refrigeration unit communicates with the first evaporator coil, the second evaporator coil, and the third evaporator coil in order to circulate the refrigerant through the first evaporator coil, the second evaporator coil, and the third evaporator coil. The first evaporator coil responsive to the circulating refrigerant chills the water flowing through the cooling enclosure prior to the water exiting the cooling enclosure into the first cooling chamber. The second evaporator coil responsive to the circulating refrigerant chills the water within the first cooling chamber prior to the water exiting the first cooling chamber into the second cooling chamber. The third evaporator coil responsive to the circulating refrigerant chills the water within the second cooling chamber, thereby providing chilled water for the beverage dispenser.

The first cooling chamber and the second cooling chamber may be implemented as adjacent discrete chambers or a cooling tank of a beverage dispenser may form the first cooling chamber and the second cooling chamber. When a cooling tank implements the first cooling chamber and the second cooling chamber, the cooling tank includes therein an interior wall that divides the cooling tank into the first cooling chamber and the second cooling chamber. The interior wall includes a water transfer opening configured to deliver water chilled in the first cooling chamber to the second cooling chamber.

The on-demand cooling system for a beverage dispenser includes a control system operatively connected with the water source, the recirculation system, the refrigeration unit, a lower limit water level sensor located within the second cooling chamber, an upper limit water level sensor located within the second cooling chamber, a water temperature sensor located within the first cooling chamber, and a water temperature sensor located within the second cooling chamber. The control system, responsive to the lower limit water level sensor indicating a lower fill limit has been reached, initiates a delivery of water from the water source to the cooling enclosure such that the water flows through the cooling enclosure into the first cooling chamber and from the first cooling chamber into the second cooling chamber. The control system further activates the refrigeration unit resulting in the first evaporator zone chilling the water flowing through the cooling enclosure prior to the water exiting the cooling enclosure into the first cooling chamber, the second evaporator zone chilling the water within the first cooling chamber prior to the water exiting the first cooling chamber into the second cooling chamber, and the third evaporator zone chilling the water within the second cooling chamber, thereby providing chilled water for the beverage dispenser. The control system, responsive to the upper limit water level sensor indicating an upper fill limit has been reached, deactivates the refrigeration unit and terminates the delivery of water from the water source to the cooling enclosure.

The control system, responsive to the water temperature sensor indicating water temperature within the second cooling chamber exceeds a specified temperature, activates the recirculation system to remove water from the second cooling chamber and deliver the water to the cooling enclosure. The control system further activates the refrigeration unit resulting in the first evaporator zone chilling the water flowing through the cooling enclosure prior to the water exiting the cooling enclosure into the first cooling chamber, the second evaporator zone chilling the water within the first cooling chamber prior to the water exiting the first cooling chamber into the second cooling chamber, and the third evaporator zone chilling the water within the second cooling chamber, thereby maintaining chilled water for the beverage dispenser. The control system, responsive to the water temperature sensor indicating water temperature within the second cooling chamber is below the specified temperature, deactivates the recirculation system and the refrigeration unit.

In an alternative, the control system, responsive to the water temperature sensor within the first cooling chamber and the water temperature sensor within the second cooling chamber indicating water temperature within the first cooling chamber and the second cooling chamber exceeds a specified temperature differential, activates the recirculation system to remove water from the second cooling chamber and deliver the water to the cooling enclosure. The control system further activates the refrigeration unit resulting in the first evaporator zone chilling the water flowing through the cooling enclosure prior to the water exiting the cooling enclosure into the first cooling chamber, the second evaporator zone chilling the water within the first cooling chamber prior to the water exiting the first cooling chamber into the second cooling chamber, and the third evaporator zone chilling the water within the second cooling chamber, thereby maintaining chilled water for the beverage dispenser. The control system, responsive to the water temperature sensor within the first cooling chamber and the water temperature sensor within the second cooling chamber indicating water temperature within the first cooling chamber and the second cooling chamber is below a specified temperature differential, deactivates the recirculation system and the refrigeration unit.

In order to allow for dispensing of non-carbonated beverages, a product line is disposed within the second cooling chamber. The product line connects with a product source and with a beverage dispensing device of the beverage dispenser such that the product line delivers product syrup to the beverage dispensing device. A pump connects with an intake line extending into the second cooling chamber and with plain water tubing connected with the beverage dispensing device. The pump delivers chilled plain water within the second cooling chamber to the beverage dispensing device for mixing with product syrup to produce a non-carbonated beverage dispensed from the beverage dispensing device.

In order to allow for dispensing of carbonated beverages, a product line is disposed within the second cooling chamber. The product line connects with a product source and with a beverage dispensing device of the beverage dispenser such that the product line delivers product syrup to the beverage dispensing device. A carbonator located within the second cooling chamber connects with a $CO_2$ gas source. A pump connects with an intake line extending into the second cooling chamber and with a feed line connected with the carbonator. The pump delivers chilled plain water within the second cooling chamber to the carbonator. A pump connects with a feed line extending from the carbonator and with carbonated water tubing connected with the beverage dispensing device. The pump delivers chilled carbonated water from the carbonator to the beverage dispensing device for mixing with product syrup to produce a carbonated beverage dispensed from the beverage dispensing device.

A method of on-demand cooling in a beverage dispenser is implanted in accordance with the following steps. A refrigerant is circulated through a first evaporator zone, a second evaporator zone, and a third evaporator zone. Water is flowed through a cooling enclosure disposed about the first evaporator zone such that the first evaporator zone chills the water flowing through the cooling enclosure prior to the water exiting the cooling enclosure. Water is flowed from the cooling enclosure into a first cooling chamber having the second evaporator zone therein such that the second evaporator zone chills the water within the first cooling chamber prior to the water exiting the first cooling chamber. Water is flowed from the first cooling chamber into a second cooling chamber having the third evaporator zone therein such that the third evaporator zone chills the water within the second cooling chamber, thereby providing chilled water for the beverage dispenser.

Flowing water through a cooling enclosure includes initiating a delivery of water from a water source to the cooling enclosure responsive to an indication a lower fill limit has been reached. Concurrent with the initiating of water delivery from a water source to the cooling enclosure, refrigerant is circulated the through the first evaporator zone, the second evaporator zone, and the third evaporator zone such that the first evaporator zone chills the water flowing through the cooling enclosure, the second evaporator zone chills the water within the first cooling chamber, and the third evaporator zone chills the water within the second cooling chamber. Water delivery from the water source to the cooling enclosure and refrigerant circulation are terminated responsive to an indication an upper fill limit has been reached.

Flowing water through a cooling enclosure includes removing water from the second cooling chamber and delivering the water to the cooling enclosure responsive to an indication water temperature exceeds a specified temperature. Concurrent with water delivery from the second cooling chamber to the cooling enclosure, refrigerant is circulated through the first evaporator zone, the second evaporator zone, and the third evaporator zone such that the first evaporator zone chills the water flowing through the cooling enclosure, the second evaporator zone chills the water within the first cooling chamber, and the third evaporator zone chills the water within the second cooling chamber, thereby maintaining chilled water for the beverage dispenser. Water delivery from the second cooling chamber to the cooling enclosure and refrigerant circulation are terminated responsive to an indication water temperature is below the specified temperature.

In an alternative, flowing water through a cooling enclosure includes removing water from the second cooling chamber and delivering the water to the cooling enclosure responsive to an indication water temperature within the first cooling chamber and the second cooling chamber exceeds a specified temperature differential. Concurrent with water delivery from the second cooling chamber to the cooling enclosure, refrigerant is circulated through the first evaporator zone, the second evaporator zone, and the third evaporator zone such that the first evaporator zone chills the water flowing through the cooling enclosure, the second evaporator zone chills the water within the first cooling chamber, and the third evaporator zone chills the water within the second cooling chamber, thereby maintaining chilled water for the beverage dispenser. Water delivery from the second cooling chamber to the cooling enclosure and refrigerant circulation are terminated responsive to an indication water temperature within the first cooling chamber and the second cooling chamber is below the specified temperature differential.

It is therefore an object of the present invention to provide an on-demand cooling system for a beverage dispenser that maintains a desired beverage dispensing capacity and capability while operating without a solid bank of cooling fluid.

It is another object of the present invention to provide an on-demand cooling system for a beverage dispenser that advantageously reduces beverage dispenser size and weight while eliminating unreliable components.

It is further object of the present invention to provide an on-demand cooling system for a beverage dispenser that lessens beverage dispenser power consumption while substantially decreasing beverage dispenser start up time.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

DETAILED DESCRIPTION OF THE PREFERRED EMBODIMENTS

Figure 1:
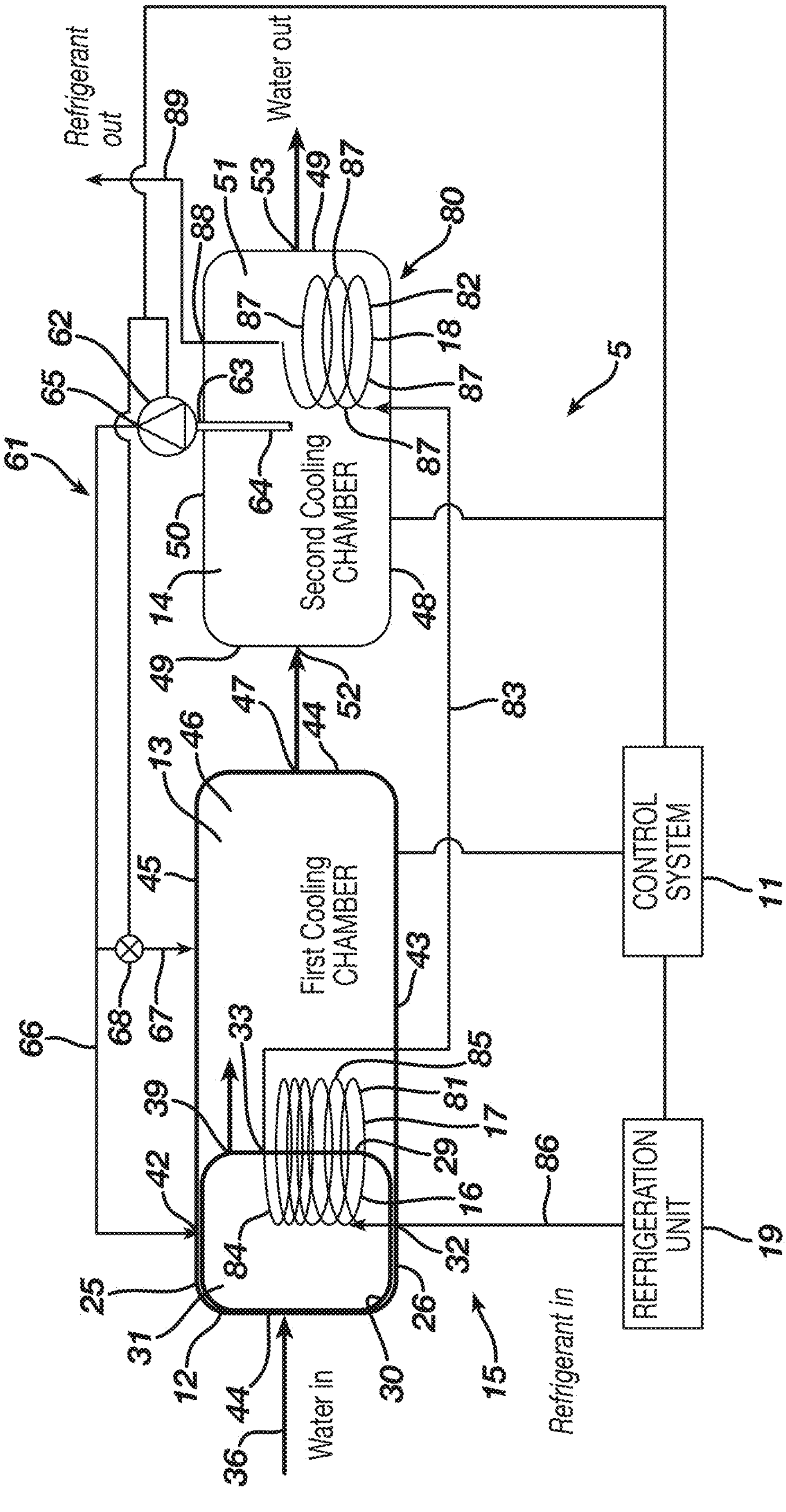
FIG. 1 is a block diagram illustrating an on-demand cooling system for a beverage dispenser according to a preferred embodiment.

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

The present invention illustrated in FIGS. 1-7 and set forth in the following preferred embodiments is an on-demand cooling system 5 configured to provide chilled water for a beverage dispenser such as the example beverage dispenser 10 illustrated in FIG. 8. The on-demand cooling system 10 includes a control system 11 operatively connected within the on-demand cooling system 10 to control operations thereof. The on-demand cooling system 10 includes a cooling enclosure 12, a first cooling chamber 13, a second cooling chamber 14, and a refrigeration system 15 communicating with the cooling enclosure 12, the first cooling chamber 13, and the second cooling chamber 14. The refrigeration system 15, under the control of the control system 11, operates according to a refrigeration cycle whereby a refrigerant circulating through the refrigeration system 15 removes heat energy from water within the cooling enclosure 12, the first cooling chamber 13, and the second cooling chamber 14, and then transfers the removed heat energy from the refrigeration system 15 external to the cooling enclosure 12, the first cooling chamber 13, and the second cooling chamber 14, thereby providing chilled water for a beverage dispenser below a specified temperature. In the preferred embodiments, the specified temperature is greater than 32° F./0° C. and is represented by the equation 32° F./0° C.+X where X is the experimental temperature range that supports a specific beverage dispenser performance goal per energy and drink dispensing capacity need. As an illustration, which is not intended to be limiting, X typically is between 1 and 8 such that the specified temperature is between 33° F./0.56° C. and 40° F./4.4° C.

The refrigeration system 15 includes a first evaporator zone 16, a second evaporator zone 17, a third evaporator zone 18, and a refrigeration unit 19 operatively connected with the first evaporator zone 16, the second evaporator zone 17, and the third evaporator zone 18. The refrigeration unit 19 in accordance with a refrigeration cycle circulates a refrigerant through the first evaporator zone 16, the second evaporator zone 17, and the third evaporator zone 18. The refrigeration unit 19, which is located exterior to the cooling enclosure 12, the first cooling chamber 13, and the second cooling chamber 14, includes in the preferred embodiments a compressor 20, a condenser 21, an expansion device 22, and first and second receivers 23 and 24 that function as refrigerant reservoirs configured to provide a constant supply of refrigerant within the refrigeration system 15. The compressor 20 compresses the refrigerant prior to delivering the refrigerant to the condenser 21. The condenser 21 condenses the refrigerant resulting in a release of heat energy stored therein prior to the condenser 21 delivering the refrigerant to the expansion device 23 via the first receiver 23. The condenser 21 may include a fan that aids in transferring heat energy released from the condensed refrigerant exterior to the refrigeration unit 19 and thus the cooling enclosure 12, the first cooling chamber 13, and the second cooling chamber 14. The expansion device 22 expands the refrigerant prior to delivering the refrigerant to the first evaporator zone 16, the second evaporator zone 17, and the third evaporator zone 18. The first evaporator zone 16, the second evaporator zone 17, and the third evaporator zone 18 evaporate the refrigerant resulting in the refrigerant absorbing heat energy from water within the cooling enclosure 12, the first cooling chamber 13, and the second cooling chamber 14 prior to a return of the refrigerant to the compressor 20 from the first evaporator zone 16, the second evaporator zone 17, and the third evaporator zone 18 via the second receiver 24 for a repeat of the refrigeration cycle.

The cooling enclosure 12 in the preferred embodiments includes a top 25, a bottom 26, first and second sides 27 and 28, a front 29, and a rear 30 defining an interior compartment 31 of the cooling enclosure 12 that encases therein the first evaporator zone 16 of the refrigeration system 15. The cooling enclosure 12 in the rear 30, or alternatively in the bottom 26, the front 29, the first side 27, or the second side 28, includes an entrance opening 32 for the first evaporator zone 16. The cooling enclosure 12 in the front 29, or alternatively in the first side 27, the second side 28, or the bottom 26 includes an exit opening 33 for the first evaporator zone 16. The cooling enclosure 12 encases the first evaporator zone 16 and seals the first evaporator zone 16 therein such that turbulence and direct contact between water within the cooling enclosure 12 and the first evaporator zone 16 is maximized thereby maximizing heat energy transfer from the water to the refrigerant flowing through the first evaporator zone 16.

The cooling enclosure 12 in the top 25, or alternatively in the bottom 26, the first side 27, the second side 28, or the rear 30 includes a water inlet 34 connected with a water source 35, typically a public water supply, using a water line 36 including a valve 37 that provides on/off flow control while preventing unwanted water backflow. The water inlet 34 permits water flow into the cooling enclosure 12 from the water source 35 for flow therethrough. The cooling enclosure 12 in the bottom 26, or alternatively in the top 25, the first side 27, the second side 28, or the front 29 includes a water outlet 39 that permits exit of water flowing through the cooling enclosure 12. The cooling enclosure 12 in the front 29, the first side 27, and the second side 28, may include water transfer openings 40 that increase the volume of water exiting the cooling enclosure 12 during water entry into the cooling enclosure 12. Conversely, when water entry into the cooling enclosure 12 ceases, the water transfer openings 40 allow water return to the cooling enclosure 12 for heat energy transfer to refrigerant within the first evaporator zone 16. When increased water pressure and thus water flow through the cooling enclosure 12 is necessary, a pump 41 may be inserted into the water line 36 between the water source 35 and the valve 37. The cooling enclosure 12 in the top 25, or alternatively in the bottom 26, the first side 27, the second side 28, or the front 29 includes a water recirculation inlet 42 that allows return to the cooling enclosure 12 of prior chilled water for re-chilling.

The first cooling chamber 13 includes a bottom 43 supporting at least three sides 44 with four sides 44 being the most common and a top 45 supported by the sides 44 that define an interior compartment 46 of the first cooling chamber 13. The bottom 43, the sides 44, and the top 45 in the preferred embodiments include insulation therein that maximizes the ability of the first cooling chamber 13 to block heat energy transfer into the interior compartment 46 thereof. The first cooling chamber 13 in the preferred embodiments incorporates therein the cooling enclosure 12 secured to one of the sides 44 using known fixturing. In accordance therewith, the cooling enclosure 12 via the water outlet 39 thereof delivers water chilled in the cooling enclosure 12 using the first evaporator zone 16 into the interior compartment 46 of the first cooling chamber 13 as chilled water. When water delivery from the cooling enclosure 12 to the first cooling chamber 13 ceases, the water transfer openings 40 of the cooling enclosure 12 allow water within the first cooling chamber 13 to enter the cooling enclosure 12 for heat energy transfer to refrigerant within the first evaporator zone 16. Although the preferred embodiments include the cooling enclosure 12 residing within the first cooling chamber 13, one of ordinary skill in the art will recognize the cooling enclosure 12 may reside exterior to one of the sides 44 with the water outlet 39 of the cooling enclosure 12 communicating with the interior compartment 46 of the first cooling chamber 13 through an inlet in the side 44. The first cooling chamber 13 includes in the interior compartment 46 the second evaporator zone 17 whereby the prior chilled water received into the first cooling chamber 13 from the cooling enclosure 12 transfers heat energy to the refrigerant flowing through the second evaporator zone 17 thereby further chilling the water. The first cooling chamber 13 in one of the sides 44, preferably in a bottom thereof, includes a water outlet 47 that permits exit of water from the first cooling chamber 13.

The second cooling chamber 14 includes a bottom 48 supporting at least three sides 49 with four sides 49 being the most common and a top 50 supported by the sides 44 that define an interior compartment 51 of the second cooling chamber 14. The bottom 48, the sides 49, and the top 50 in the preferred embodiments include insulation therein that maximizes the ability of the second cooling chamber 14 to block heat energy transfer into the interior compartment 51 thereof. The second cooling chamber 14 in one of the sides 44, preferably in a bottom thereof, includes a water inlet 52 that permits ingress of chilled water from the first cooling chamber 13 into the second cooling chamber 14. The first cooling chamber 13 and the second cooling chamber 14 at respective sides 44 and 49 thereof reside adjacent whereby the water outlet 47 operatively aligns with the water inlet 52. In accordance therewith, the first cooling chamber 13 via the water outlet 47 thereof delivers water chilled in the first cooling chamber 13 using the second evaporator zone 17 into the interior compartment 51 of the second cooling chamber 14 via the water inlet 52 as chilled water. The second cooling chamber 14 includes in the interior compartment 51 the third evaporator zone 18 whereby the prior chilled water received into the second cooling chamber 14 from the first cooling chamber 13 transfers heat energy to the refrigerant flowing through the third evaporator zone 18 thereby further chilling the water. The second cooling chamber 14 in one of the sides 49 includes a water outlet 53 that permits exit of water from the second cooling chamber 14 for use as chilled water by a beverage dispenser.

While one of ordinary skill in the art will recognize the first cooling chamber 13 and the second cooling chamber 14 may be implemented as previously described through adjacent discrete chambers communicating via a respective outlet and inlet, the first cooling chamber 13 and the second cooling chamber 14 in the preferred embodiments comprise a cooling tank 54 including a bottom 55 supporting sides 56, and a top 57 supported by the sides 56 that define an interior compartment 58 of the cooling tank 54. The bottom 55, the sides 56, and the top 57 in the preferred embodiments include insulation therein that maximizes the ability of the cooling tank 54 to block heat energy transfer into the interior compartment 58 thereof. The cooling tank 54 includes an interior wall 59 that divides the cooling tank 54 into the first cooling chamber 13 and the second cooling chamber 14. The interior wall 59 in a bottom thereof includes a water transfer opening 60 configured to deliver water chilled in the first cooling chamber 13 using the second evaporator zone 17 into the second cooling chamber 14 as chilled water. The second cooling chamber 14, upon receiving the chilled water, further chills the water using the third evaporator zone 18 such that the second cooling chamber 14 via the water outlet 53 provides chilled water for use by a beverage dispenser.

The on-demand cooling system 10 in order to maintain water therein below the specified temperature during periods of non-use includes a recirculation system 61 in the preferred embodiments. The recirculation system 61, under the control of the control system 11, circulates water from the second cooling chamber 14 to the cooling enclosure 12 and if desired also to the first cooling chamber 13 for chilling therein as previously described prior to a return to the second cooling chamber 14 via the water transfer opening 60. The recirculation system 61 includes a pump 62 supported by the cooling tank 54 whereby the pump 62 connects at an inlet 63 with an intake line 64 extending into the second cooling chamber 14 and at an outlet 65 with a feed line 66 extending to and connecting with the water recirculation inlet 42 of the cooling enclosure 12. The feed line 66 connects with a secondary feed line 67 extending into the first cooling chamber 13 although the secondary feed line 67 includes therein a valve 67 that provides on/off flow control through the secondary feed line 67 to the first cooling chamber 13. Upon activation, the pump 62 draws water from the second cooling chamber 14 using the intake line 64 and delivers the water to the cooling enclosure 12 using the feed line 66. The cooling enclosure 12 chills the water and then delivers the chilled water to the first cooling chamber 13 for continued chilling. The first cooling chamber 13 via the water transfer opening 60 delivers the chilled water to the second cooling chamber 14 for continued chilling and use by a beverage dispenser. If delivery of chilled water from the second cooling chamber 14 to the first cooling chamber 13 is desired, an activation of the valve 68 permits flow of water from the feed line 66 into the secondary feed line 67 and then into the first cooling chamber 13 for chilling prior to delivery into the second cooling chamber 14 via the water transfer opening 60.

In the event a beverage dispenser is to dispense carbonated drinks, the on-demand cooling system 10 includes a carbonator system 69. The carbonator system 69 in the preferred embodiments includes a carbonator 70 located in the cooling tank 54, preferably in the second cooling chamber 14, and a pump 71 supported by the cooling tank 54. The pump 71 connects at an inlet 72 with an intake line 73 extending into the second cooling chamber 14 and at an outlet 74 with a feed line 75 extending to and connecting with the carbonator 70. Upon activation, the pump 71 draws chilled water from the second cooling chamber 14 using the intake line 73 and delivers the chilled water to the carbonator 70 using the feed line 75 for use by the carbonator 70 in producing carbonated water. While the pump 71 is depicted as exterior to the cooling tank 54, one of ordinary skill in the art will recognize the pump 71 may be located in the cooling tank 54, preferably in the second cooling chamber 14. The carbonator 70 receives $CO_2$ gas from a gas inlet line 76 connected with the carbonator and with a $CO_2$ gas source, such a gas cylinder, whereby the carbonator entrains the $CO_2$ gas within the chilled water therein to produce the carbonated water used by the beverage dispenser when forming carbonated drinks. The carbonator 70 delivers carbonated water therefrom via a carbonated water line 77 including the water outlet 53.

The first evaporator zone 16, the second evaporator zone 17, and the third evaporator zone 18 of the refrigeration system 15 are implemented in the preferred embodiments using an evaporator coil 80 suitable to evaporate a refrigerant flowing therethrough. The evaporator coil 80 in the preferred embodiments comprises tubing run in a circuitous pathway traversing the cooling enclosure 12, the first cooling chamber 13, and the second cooling chamber 14. The evaporator coil 80 includes a box, helical, serpentine, or the like type structure whereby the evaporator coil 80 fits into space available within the cooling enclosure 12, the first cooling chamber 13, and the second cooling chamber 14 while maximizing surface area contact with water located within the cooling enclosure 12, the first cooling chamber 13, and the second cooling chamber 14.

The evaporator coil 80 in the preferred embodiment illustrated in FIGS. 1-4 includes a first evaporator coil 81 connected with a second evaporator coil 82 through a transfer line 83. The first evaporator coil 81 in a box or helical structure traverses the first cooling chamber 13 adjacent the sides 44 thereof. The first evaporator coil 81 in traversing the first cooling chamber 13 adjacent the sides 44 includes an evaporator coil segment 84 adjacent one the sides 44 encased within the cooling enclosure 12 such that the evaporator coil segment 84 forms within the cooling enclosure 12 the first evaporator zone 16 of the refrigeration system 15. The first evaporator coil 81 further in traversing the first cooling chamber 13 adjacent the sides 44 includes evaporator coil segments 85 adjacent the remaining sides 44 such that the evaporator coil segments 85 form within the first cooling chamber 13 the second evaporator zone 17 of the refrigeration system 15.

The first evaporator coil 81 at the evaporator coil segment 84 and thus the evaporator coil 80 connects through the entrance opening 32 with a refrigerant feed line 86 from the refrigeration unit 19, and, in particular, the expansion device 22, in order to receive refrigerant into the first evaporator coil 81 and thus the evaporator coil 80. The refrigerant traverses the first evaporator coil 81 through the evaporator coil segments 84 and 85 thereof such that the evaporator coil segment 84 forming the first evaporator zone 16, via the refrigerant, removes heat from water within the cooling enclosure 12 and the evaporator coil segments 85 forming the second evaporator zone 17, via the refrigerant, removes heat from water within the first cooling chamber 13. The first evaporator coil 81 at the evaporator coil segment 84 connects through the exit opening 33 with the transfer line 83. In accordance therewith, the refrigerant, after traversing the first evaporator coil 81 through the evaporator coil segments 84 and 85 thereof, flows into the second evaporator coil 82 through the transfer line 83. The transfer line 83 as shown runs from the first cooling chamber 13 to the second cooling chamber 14 over the interior wall 59 or alternatively through the interior wall 59. Although the refrigerant has been described as entering and exiting the first evaporator coil 81 at the evaporator coil segment 84, one of ordinary skill in the art will recognize the refrigerant could enter and exit the first evaporator coil 81 at one of the evaporator coil segments 85.

The second evaporator coil 82 in a box or helical structure traverses the second cooling chamber 14 adjacent the sides 49 thereof. The second evaporator coil 82 in traversing the second cooling chamber 14 adjacent the sides 49 includes evaporator coil segments 87 that form within the second cooling chamber 14 the third evaporator zone 18 of the refrigeration system 15. The refrigerant, upon flowing into the second evaporator coil 82 from the transfer line 83, traverses the second evaporator coil 82 through the evaporator coil segments 87 thereof such that the evaporator coil segments 87 forming the third evaporator zone 18, via the refrigerant, removes heat from water within the second cooling chamber 14. The second evaporator coil 82 and thus the evaporator coil 80 at an exit opening 88 in the second cooling chamber 14 connects with the refrigeration unit 19, and, in particular, the second receiver 24, through a refrigerant return line 89 in order to return refrigerant from the second evaporator coil 82 and thus the evaporator coil 80 to the refrigeration unit 19 for a repeat of the refrigeration cycle.

Figure 6:
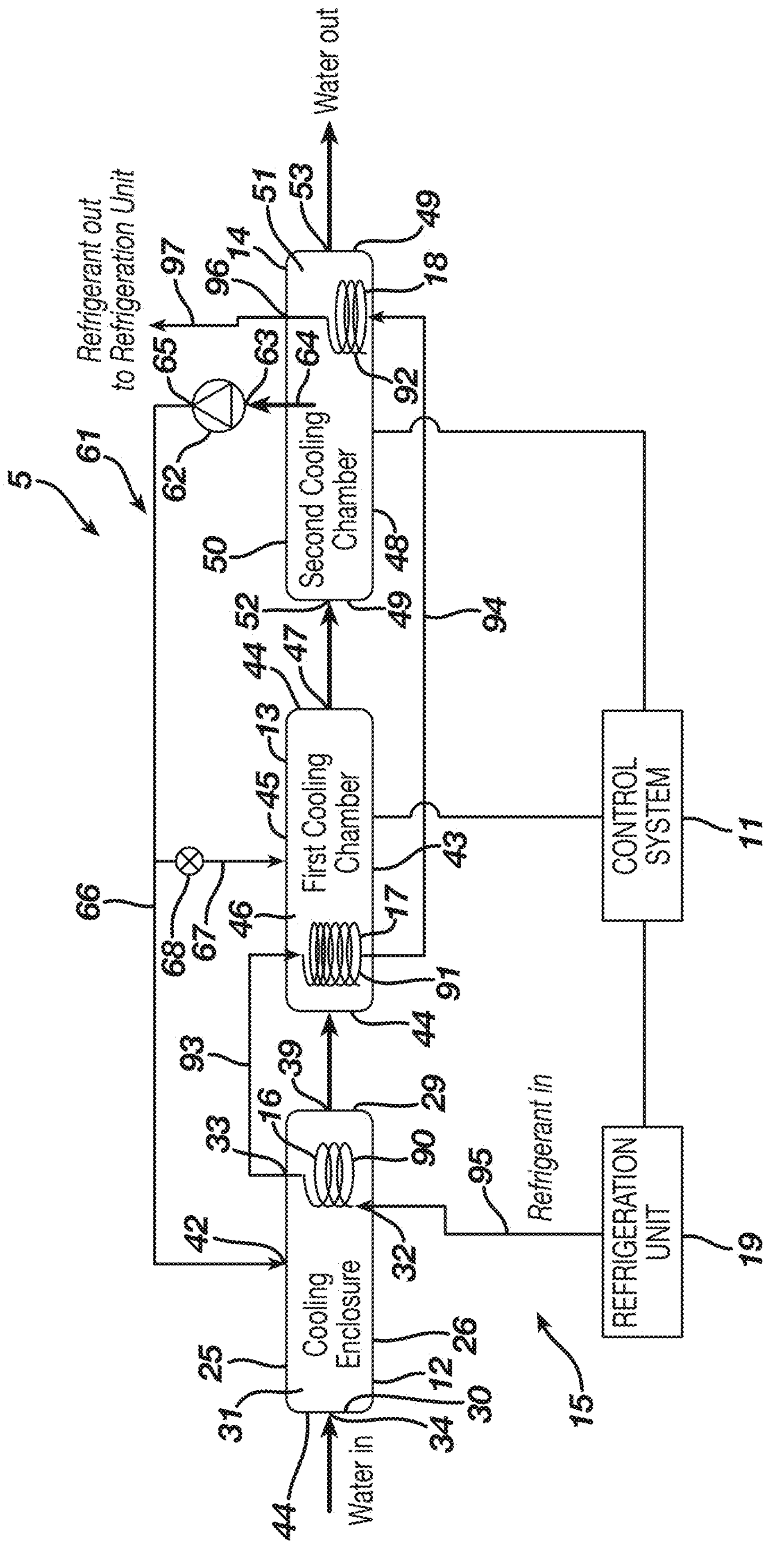
FIG. 6 is a block diagram illustrating an on-demand cooling system for a beverage dispenser according to an alternative of the preferred embodiment.

Referring to FIG. 6, the evaporator coil 80 in an on-demand cooling system 5 alternative to the preferred embodiment includes a first evaporator coil 90, a second evaporator coil 91, and a third evaporator coil 92 whereby the first evaporator coil 90 connects with the second evaporator coil 91 through a transfer line 93 and the second evaporator coil 91 connects with the third evaporator coil 92 through a transfer line 94. Like parts of the on-demand cooling system 5 alternative to the preferred embodiment shown in FIG. 6 have been labeled with like numerals of the on-demand cooling system 5 shown in FIGS. 1-4.

The first evaporator coil 90 in a box, helical, or serpentine structure traverses the cooling enclosure 12 from the bottom 26 to the top 25 adjacent the front 29 and the rear 30 such that the first evaporator coil 90 forms within the cooling enclosure 12 the first evaporator zone 16 of the refrigeration system 15. The first evaporator coil 90 and thus the evaporator coil 80 connects through the entrance opening 32 with a refrigerant feed line 95 from the refrigeration unit 19, and, in particular, the expansion device 22, in order to receive refrigerant into the first evaporator coil 90 and thus the evaporator coil 80. The refrigerant traverses the first evaporator coil 90 such that the first evaporator coil 90 forming the first evaporator zone 16, via the refrigerant, removes heat from water within the cooling enclosure 12. The first evaporator coil 90 connects through the exit opening 33 with the transfer line 93. In accordance therewith, the refrigerant, after traversing the first evaporator coil 90, flows into the second evaporator coil 91 through the transfer line 93.

The second evaporator coil 91 in a box, helical, or serpentine structure traverses the first cooling chamber 13 adjacent the sides 44 thereof. The second evaporator coil 91 in traversing the first cooling chamber 13 adjacent the sides 44 forms within the first cooling chamber 13 the second evaporator zone 17 of the refrigeration system 15. The refrigerant, upon flowing into the second evaporator coil 91 from the transfer line 93, traverses the second evaporator coil 91 such that the second evaporator coil 91 forming the second evaporator zone 17, via the refrigerant, removes heat from water within the first cooling chamber 13. The second evaporator coil 91 connects with the transfer line 94 whereby the refrigerant, after traversing the second evaporator coil 91, flows into the third evaporator coil 92 through the transfer line 94. The transfer line 94 runs from the first cooling chamber 13 to the second cooling chamber 14 over the interior wall 59 or alternatively through the interior wall 59.

The third evaporator coil 92 in a box, helical, serpentine structure traverses the second cooling chamber 14 adjacent the sides 49 thereof. The second evaporator coil 92 in traversing the second cooling chamber 14 adjacent the sides 49 forms within the second cooling chamber 14 the third evaporator zone 18 of the refrigeration system 15. The refrigerant, upon flowing into the second evaporator coil 82 from the transfer line 94, traverses the third evaporator coil 92 such that the third evaporator coil 92 forming the third evaporator zone 18, via the refrigerant, removes heat from water within the second cooling chamber 14. The third evaporator coil 92 and thus the evaporator coil 80 at an exit opening 96 in the second cooling chamber 14 connects with the refrigeration unit 19, and, in particular, the second receiver 24, through a refrigerant return line 97 in order to return refrigerant from the third evaporator coil 92 and thus the evaporator coil 80 to the refrigeration unit 19 for a repeat of the refrigeration cycle.

Figure 7:
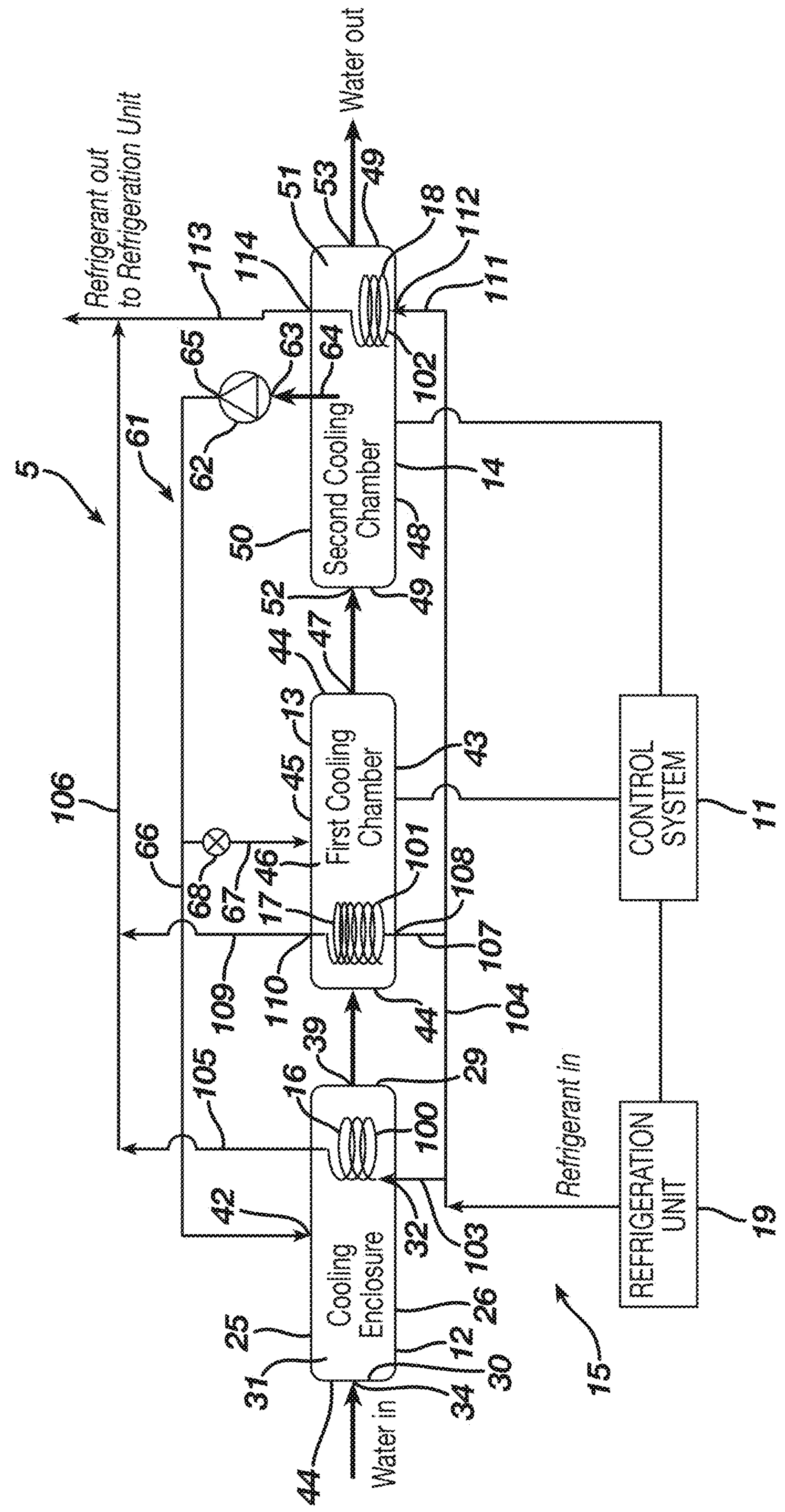
FIG. 7 is a block diagram illustrating an on-demand cooling system for a beverage dispenser according to an alternative of the preferred embodiment.

Referring to FIG. 7, the evaporator coil 80 in an on-demand cooling system 5 alternative to the preferred embodiment includes a first evaporator coil 100, a second evaporator coil 101, and a third evaporator coil 102 connected with the refrigeration unit 19 in a parallel configuration. Like parts of the on-demand cooling system 5 alternative to the preferred embodiment shown in FIG. 7 have been labeled with like numerals of the on-demand cooling system 5 shown in FIGS. 1-4.

The first evaporator coil 100 in a box, helical, or serpentine structure traverses the cooling enclosure 12 from the bottom 26 to the top 25 adjacent the front 29 and the rear 30 such that the first evaporator coil 100 forms within the cooling enclosure 12 the first evaporator zone 16 of the refrigeration system 15. The first evaporator coil 100 at an input line 103 and thus the evaporator coil 80 connects through the entrance opening 32 with a refrigerant feed line 104 from the refrigeration unit 19, and, in particular, the expansion device 22, in order to receive refrigerant into the first evaporator coil 100 and thus the evaporator coil 80. The refrigerant traverses the first evaporator coil 100 such that the first evaporator coil 100 forming the first evaporator zone 16, via the refrigerant, removes heat from water within the cooling enclosure 12. The first evaporator coil 100 at an output line 105 and thus the evaporator coil 80 connects through the exit opening 33 with the refrigeration unit 19, and, in particular, the second receiver 24, through a refrigerant return line 106 in order to return refrigerant from the first evaporator coil 100 and thus the evaporator coil 80 to the refrigeration unit 19 for a repeat of the refrigeration cycle.

The second evaporator coil 101 in a box, helical, or serpentine structure traverses the first cooling chamber 13 adjacent the sides 44 thereof. The second evaporator coil 101 in traversing the first cooling chamber 13 adjacent the sides 44 forms within the first cooling chamber 13 the second evaporator zone 17 of the refrigeration system 15. The second evaporator coil 101 at an input line 107 and thus the evaporator coil 80 connects through an entrance opening 108 with the refrigerant feed line 104 from the refrigeration unit 19, and, in particular, the expansion device 22, in order to receive refrigerant into the second evaporator coil 101 and thus the evaporator coil 80. The refrigerant, upon flowing into the second evaporator coil 101 from the input line 107, traverses the second evaporator coil 101 such that the second evaporator coil 101 forming the second evaporator zone 17, via the refrigerant, removes heat from water within the first cooling chamber 13. The second evaporator coil 101 at an output line 109 and thus the evaporator coil 80 connects through an exit opening 110 in the first cooling chamber 13 with the refrigeration unit 19, and, in particular, the second receiver 24, through the refrigerant return line 106 in order to return refrigerant from the second evaporator coil 101 and thus the evaporator coil 80 to the refrigeration unit 19 for a repeat of the refrigeration cycle.

The third evaporator coil 102 in a box, helical, or serpentine structure traverses the second cooling chamber 14 adjacent the sides 49 thereof. The third evaporator coil 102 in traversing the second cooling chamber 14 adjacent the sides 49 forms within the second cooling chamber 14 the third evaporator zone 18 of the refrigeration system 15. The third evaporator coil 102 at an input line 111 and thus the evaporator coil 80 connects through an entrance opening 112 with the refrigerant feed line 104 from the refrigeration unit 19, and, in particular, the expansion device 22, in order to receive refrigerant into the third evaporator coil 102 and thus the evaporator coil 80. The refrigerant, upon flowing into the third evaporator coil 102 from the input line 111, traverses the third evaporator coil 102 such that the third evaporator coil 102 forming the third evaporator zone 18, via the refrigerant, removes heat from water within the second cooling chamber 14. The third evaporator coil 102 at an output line 113 and thus the evaporator coil 80 connects through an exit opening 114 in the second cooling chamber 14 with the refrigeration unit 19, and, in particular, the second receiver 24, through the refrigerant return line 106 in order to return refrigerant from the third evaporator coil 102 and thus the evaporator coil 80 to the refrigeration unit 19 for a repeat of the refrigeration cycle.

The control system 11 in the preferred embodiments is a control system including components of a known type and operation in the refrigeration and beverage dispensing arts. In accordance therewith, the control system 11 includes electrical components, such as, for example, solenoids, switches, and the like, and a suitable control device, such as, for example, a central processing unit (CPU), a microprocessor, a micro-controller, and the like, and ancillary components, such as, for example, a bus, RAM or ROM storage, input/output devices, communication interfaces, and the like. The control system 11 electrically connects, via wiring, a wiring harnesses, and the like, with the components of the on-demand cooling system 5, including electrical connections between the control system 11 and the refrigeration unit 19; the valves 37 and 68; the pumps 41, 62, and 71; a water temperature sensor 115 disposed in the first cooling chamber 13; a water temperature sensor 116 disposed in the second cooling chamber 14; a lower limit water level sensor 117 disposed in the second cooling chamber 14 or the first cooling chamber 13; and an upper limit water level sensor 118 disposed in the second cooling chamber 14 or the first cooling chamber 13.

Initialization of the on-demand cooling system 5 includes the control system 11 activating the valve 37 and the pump 41 if included to deliver water from the water source 35 into the cooling enclosure 12 via the water inlet 34. The control system 11 concurrently activates the refrigeration system 15 resulting in the refrigeration unit 19 flowing refrigerant through the evaporator coil 80 comprising the first evaporator zone 16, the second evaporator zone 17, and the third evaporator zone 18. The water flows through the cooling enclosure 12 for exit therefrom as chilled water into the first cooling chamber 13 via the water outlet 39. The water when flowing through the cooling enclosure 12 contacts the first evaporator zone 16 comprised of one of the evaporator coil segment 84 of the first evaporator coil 81, the first evaporator coil 90, or the first evaporator coil 100 such that the water transfers heat energy to the refrigerant flowing through the first evaporator zone 16 due to the direct contact between the water and the first evaporator zone 16 including the water turbulence created by the direct contact.

The chilled water exiting the cooling enclosure 12 via the water outlet 39 enters the first cooling chamber 13 to begin a filling thereof. As the first cooling chamber 13 fills ultimately to an upper fill limit, the water within the first cooling chamber 13 contacts the second evaporator zone 17 comprised of one of the evaporator coil segments 85 of the first evaporator coil 81, the second evaporator coil 91, or the second evaporator coil 101 such that the water transfers heat energy to the refrigerant flowing through the second evaporator zone 17 due to the direct contact between the water and the second evaporator zone 17 including any water turbulence created by the direct contact. Moreover, the chilled water entering the first cooling chamber 13 from the cooling enclosure 12 displaces the chilled water within the first cooling chamber 13 resulting in chilled water within the first cooling chamber 13 flowing through the water transfer opening 60 between the first cooling chamber 13 and the second cooling chamber 14 and entering the second cooling chamber 14 to begin a filling thereof. As the second cooling chamber 14 fills ultimately to an upper fill limit, the water within the second cooling chamber 14 contacts the third evaporator zone 18 comprised of one of the second evaporator coil 82, the third evaporator coil 92, or the third evaporator coil 102 such that the water transfers heat energy to the refrigerant flowing through the third evaporator zone 18 due to the direct contact between the water and the third evaporator zone 18 including any water turbulence created by the direct contact. The control system 11, responsive to the upper limit water level sensor 118 indicating the second cooling chamber 14 and, also, the first cooling chamber 13 have reached the upper fill limit, deactivates the valve 37 and the pump 41 if included to stop water delivery from the water source 35 into the cooling enclosure 12 via the water inlet 34.

During initialization of the on-demand cooling system 5, the control system 11, either concurrent with the filling of the first cooling chamber 13 and the second cooling chamber 14 or immediately upon the completion thereof, activates the pump 62 and the valve 68 to circulate the chilled water within the on-demand cooling system 5 among the first evaporator zone 16, the second evaporator zone 17, and the third evaporator zone 18, thereby minimizing the time necessary for the chilled water to reach a temperature below the specified temperature. Upon activation, the pump 62 via the intake line 64 removes chilled water from the second cooling chamber 14 and then via the feed line 66 delivers the chilled water to the water recirculation inlet 42 of the cooling enclosure 12. The cooling enclosure 12 receives the chilled water therein for flow therethrough whereby the cooling chamber 12 via the first evaporator zone 16 and the refrigerant flowing therethrough removes heat energy from the chilled water prior to delivery of the chilled water into the first cooling chamber 13. Concurrently, the pump 62 via the activated valve 68 and the secondary feed line 67 delivers the chilled water to the first cooling chamber 13. The first cooling chamber 13 receives the chilled water therein for flow therethrough whereby the first cooling chamber 13 via the second evaporator zone 17 and the refrigerant flowing therethrough removes heat energy from the chilled water prior to delivery of the chilled water into the second cooling chamber 14 for further chilling using the third evaporator zone 18 and the refrigerant flowing therethrough. The control system 11 maintains the pump 62, the valve 68, and the refrigeration unit 19 activated while monitoring chilled water temperature within the first cooling chamber 13 and the second cooling chamber 14 using respectively the water temperature sensor 115 and the water temperature sensor 116. The control system 11, responsive to the water temperature sensor 115 indicating the temperature of the chilled water within the first cooling chamber 13 is below the specified temperature, the water temperature sensor 116 indicating the temperature of the chilled water within the second cooling chamber 14 is below the specified temperature, or the water temperature sensor 115 and the water temperature sensor 116 indicating respectively the temperature of the chilled water within the first cooling chamber 13 and the second cooling chamber 14 is below the specified temperature, deactivates the pump 62 and the valve 68 to stop chilled water circulation among the second cooling chamber 14, the cooling enclosure 12, and the first cooling chamber 13. The control system 11 concurrently deactivates the refrigeration system 15 resulting in the refrigeration unit 19 ceasing flow of refrigerant through the evaporator coil 80 comprising the first evaporator zone 16, the second evaporator zone 17, and the third evaporator zone 18. With the chilled water within the on-demand cooling system 5, and, in particular, within the second cooling chamber 14, below the specified temperature, the on-demand cooling system 5 is ready to supply chilled water from the second cooling chamber 14 via the water outlet 53 thereof for use by a beverage dispenser.

The on-demand cooling system 5 maintains the chilled water therein below the specified temperature through regular circulation of the chilled water among the first evaporator zone 16, the second evaporator zone 17, and the third evaporator zone 18. The control system 11 monitors chilled water temperature within the first cooling chamber 13 and the second cooling chamber 14 using respectively the water temperature sensor 115 and the water temperature sensor 116. The control system 11 monitors the water temperature sensor 115 and the water temperature sensor 116 to determine respectively when the temperature of the chilled water within the first cooling chamber 13 and the second cooling chamber 14 exceeds the specified temperature. In the alternative, the control system 11 monitors the water temperature sensor 115 and the water temperature sensor 116 to determine when the temperature of the chilled water within the second cooling chamber 14 exceeds the temperature of the chilled water within the first cooling chamber 13 by a specified temperature differential. As an illustration, which is not intended to be limiting, the specified temperature differential in the preferred embodiments typically is between 1 ° F./° C. and 3 ° F./° C. The control system 11, responsive to a determination the chilled water exceeds the specified temperature or the specified temperature differential, activates the pump 62. The control system 11 concurrently activates the refrigeration system 15 resulting in the refrigeration unit 19 flowing refrigerant through the evaporator coil 80 comprising the first evaporator zone 16, the second evaporator zone 17, and the third evaporator zone 18. Upon activation, the pump 62 via the intake line 64 removes chilled water from the second cooling chamber 14 and then via the feed line 66 delivers the chilled water to the water recirculation inlet 42 of the cooling enclosure 12. The cooling enclosure 12 receives the chilled water therein for flow therethrough whereby the cooling chamber 12 via the first evaporator zone 16 and the refrigerant flowing therethrough removes heat energy from the chilled water prior to delivery of the chilled water into the first cooling chamber 13. The first cooling chamber 13 receives the chilled water therein whereby the first cooling chamber 13 via the second evaporator zone 17 and the refrigerant flowing therethrough removes heat energy from the chilled water prior to delivery of the chilled water into the second cooling chamber 14 for further chilling using the third evaporator zone 18 and the refrigerant flowing therethrough. The control system 11 maintains the pump 62 and the refrigeration unit 19 activated while monitoring chilled water temperature within the first cooling chamber 13 and the second cooling chamber 14 using respectively the water temperature sensor 115 and the water temperature sensor 116. The control system 11, responsive to the water temperature sensor 115 indicating the temperature of the chilled water within the first cooling chamber 13 is below the specified temperature, the water temperature sensor 116 indicating the temperature of the chilled water within the second cooling chamber 14 is below the specified temperature, or the water temperature sensor 115 and the water temperature sensor 116 indicating respectively the temperature of the chilled water within the first cooling chamber 13 and the second cooling chamber 14 is below the specified temperature, or the water temperature sensor 115 and the water temperature sensor 116 indicating the temperature of the chilled water within the first cooling chamber 13 and the second cooling chamber 14 is below the specified temperature differential, deactivates the pump 62 to stop chilled water circulation among the second cooling chamber 14, the cooling enclosure 12, and the first cooling chamber 13. The control system 11 concurrently deactivates the refrigeration system 15 resulting in the refrigeration unit 19 ceasing flow of refrigerant through the evaporator coil 80 comprising the first evaporator zone 16, the second evaporator zone 17, and the third evaporator zone 18. The on-demand cooling system 5, due to the regular circulation of the chilled water therein among the first evaporator zone 16, the second evaporator zone 17, and the third evaporator zone 18 when the temperature of the chilled water within the first cooling chamber 13 and the second cooling chamber 14 exceed the specified temperature or the specified temperature differential, maintains the water below the specified temperature of while preventing unwanted formation of an ice bank in any of the first evaporator zone 16, the second evaporator zone 17, and the third evaporator zone 18. With the chilled water within the on-demand cooling system 5, and, in particular, within the second cooling chamber 14, below the specified temperature, the on-demand cooling system 5 is ready to supply chilled water from the second cooling chamber 14 via the water outlet 53 thereof for use by a beverage dispenser.

The on-demand cooling system 5 maintains a desired chilled water level therein through the lower limit water level sensor 117 and the upper limit water level sensor 118 and a monitoring thereof using the control system 11. As chilled water is removed from the second cooling chamber 14 for use by a beverage dispenser in forming a drink including the carbonator 70, the chilled water within the second cooling chamber 14 and, also, the first cooling chamber 13 ultimately sinks below a lower fill limit. The control system 11, responsive to the lower limit water level sensor 117 indicating the second cooling chamber 14 and thus the first cooling chamber 13 have reached the lower fill limit, activates the valve 37 and the pump 41 if included to start water delivery from the water source 35 into the cooling enclosure 12 via the water inlet 34. The control system 11 concurrently activates the refrigeration system 15 resulting in the refrigeration unit 19 flowing refrigerant through the evaporator coil 80 comprising the first evaporator zone 16, the second evaporator zone 17, and the third evaporator zone 18. The water from the water source 35 flows through the cooling enclosure 12 for chilling and subsequent exit into the first cooling chamber 13 as chilled water. The chilled water enters the first cooling chamber 13 for continued chilling and subsequent exit into the second cooling chamber 14 for continued chilling. The control system 11, responsive to the upper limit water level sensor 118 indicating the second cooling chamber 14 and, also, the first cooling chamber 13 have reached the upper fill limit, deactivates the valve 37 and the pump 41 if included to stop water delivery from the water source 35 into the cooling enclosure 12 via the water inlet 34. The control system 11 concurrently deactivates the refrigeration system 15 resulting in the refrigeration unit 19 ceasing flow of refrigerant through the evaporator coil 80 comprising the first evaporator zone 16, the second evaporator zone 17, and the third evaporator zone 18. With the chilled water level within the on-demand cooling system 5, and, in particular, within the second cooling chamber 14, at the upper fill limit, the on-demand cooling system 5 is ready to supply chilled water from the second cooling chamber 14 via the water outlet 53 thereof for use by a beverage dispenser. It should be understood the control system 11, responsive to a triggering of the lower limit water level sensor 117, can be configured to run the pump 62 thereby circulating the chilled water among the first evaporator zone 16, the second evaporator zone 17, and the third evaporator zone 18 until the chilled water reaches the specified temperature or the specified temperature differential, at which point the pump 62 and the refrigeration system 15 are deactivated.

Figure 2:
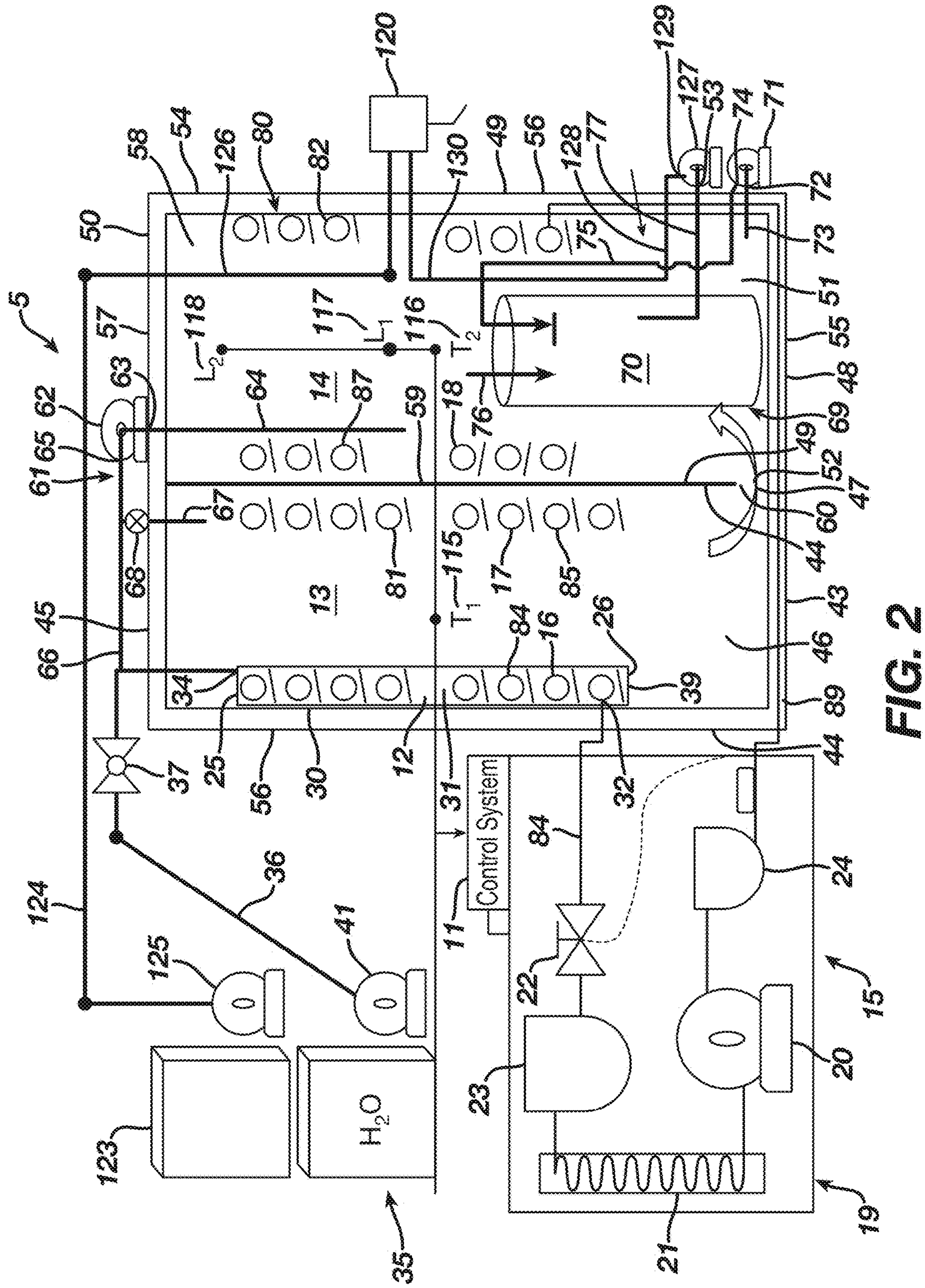
FIG. 2 is a schematic diagram illustrating the on-demand cooling system for a beverage dispenser according to the preferred embodiment.
Figure 3:
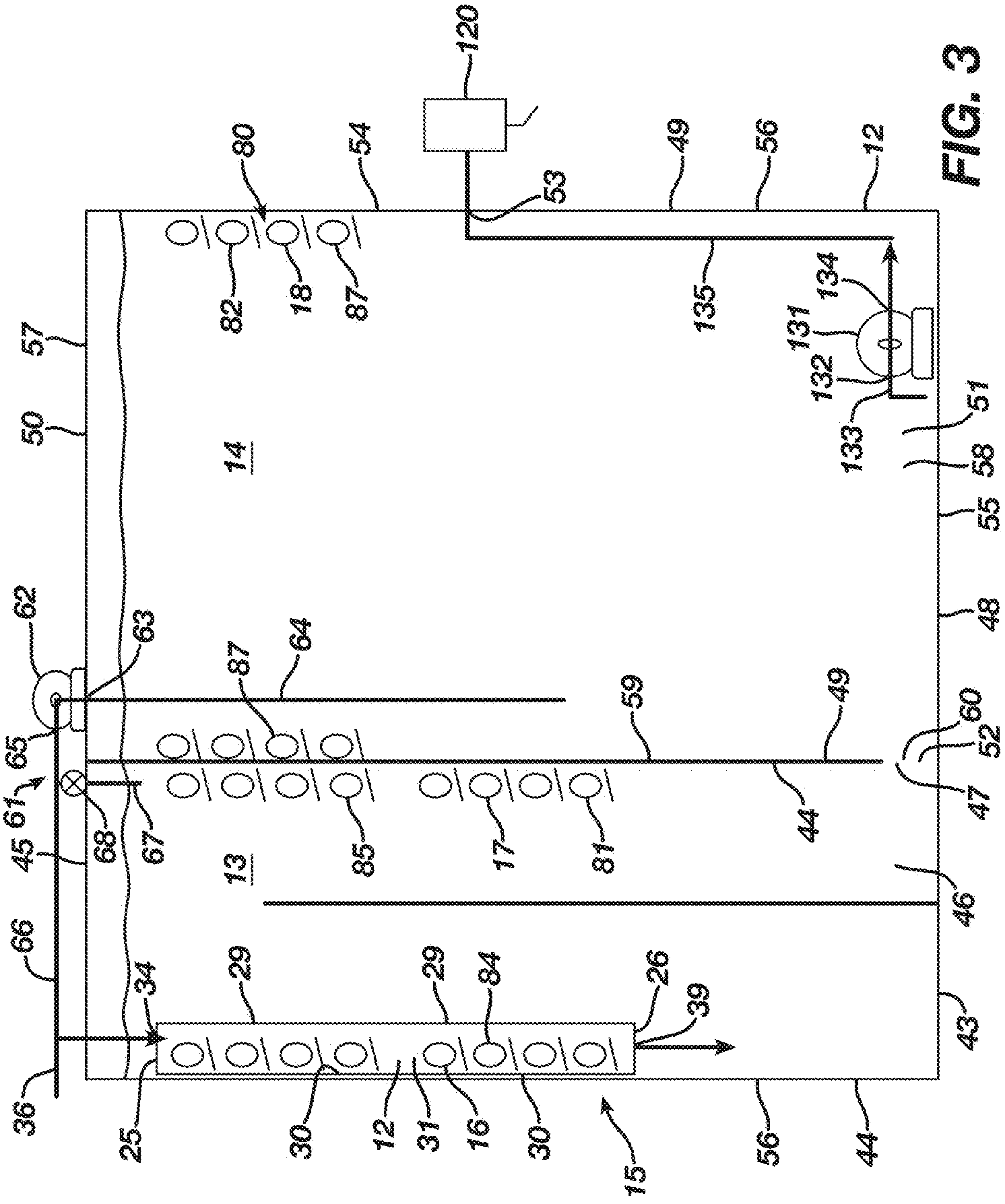
FIG. 3 is a schematic diagram illustrating the on-demand cooling system for a beverage dispenser according to the preferred embodiment.
Figure 4:
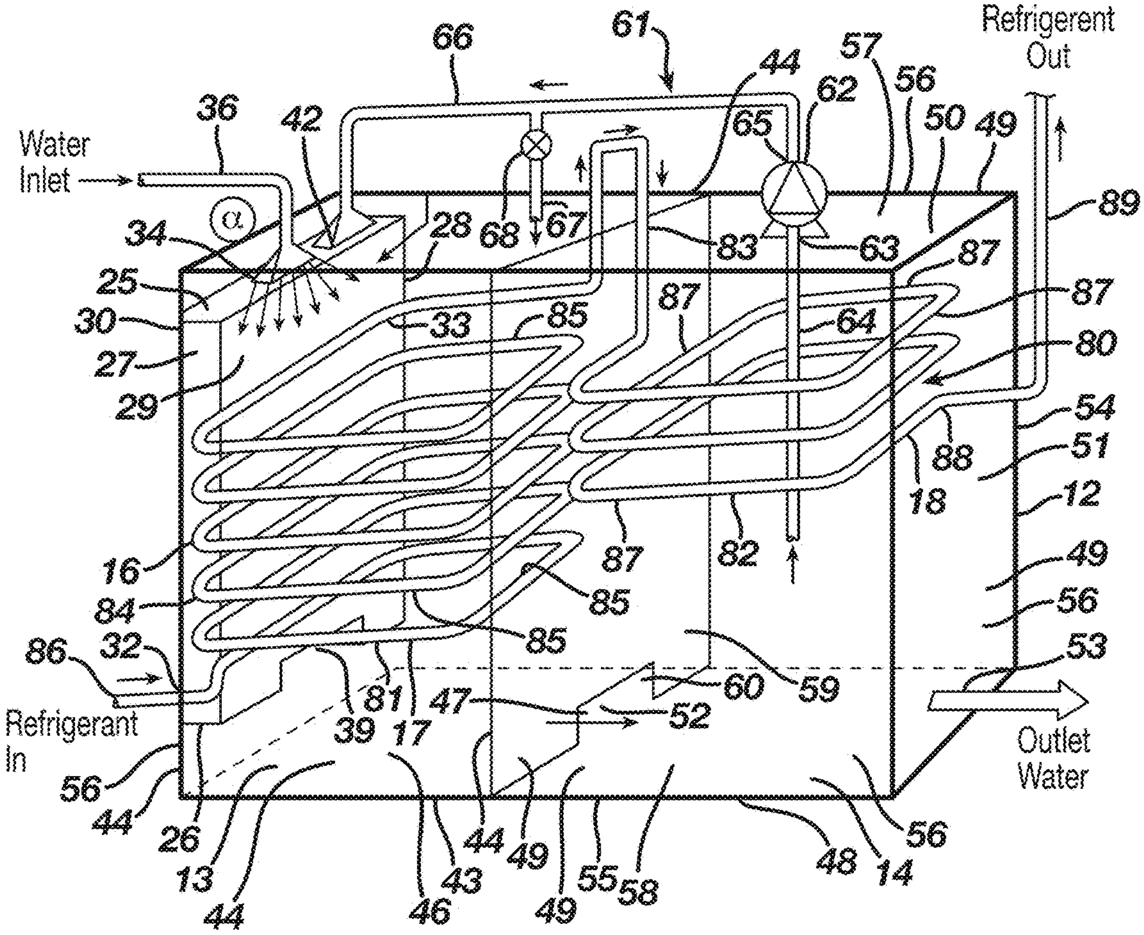
FIG. 4 is a perspective view illustrating the on-demand cooling system for a beverage dispenser according to the preferred embodiment.
Figure 5:
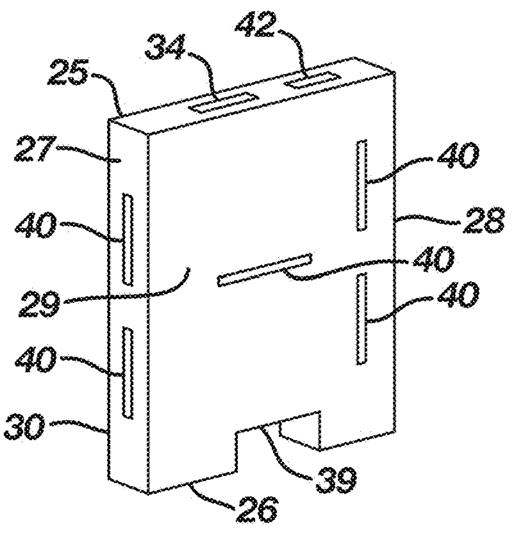
FIG. 5 is a perspective view illustrating a cooling enclosure of the on-demand cooling system for a beverage dispenser according to the preferred embodiment.
Figure 8:
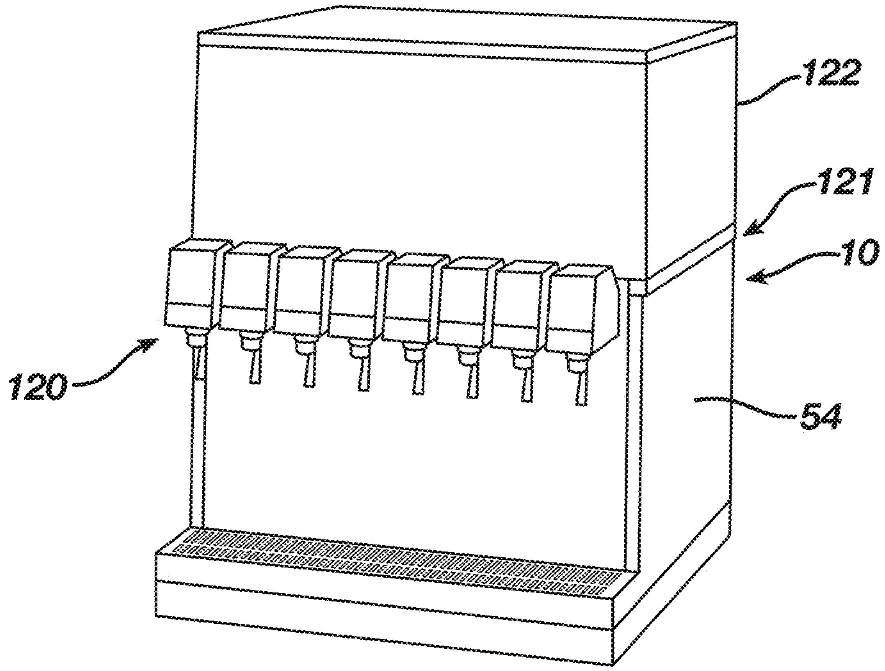
FIG. 8 is a perspective view illustrating an example beverage dispenser incorporating the on-demand cooling system according to the preferred embodiment.

The on-demand cooling system 5, when incorporated into a beverage dispenser, such as, for example, a beverage dispenser 10 of a post-mix type as illustrated in FIG. 8, interfaces with at least one beverage dispensing device 120 and typically multiple beverage dispensing devices 120 in order to supply carbonated water as a diluent to the beverage dispensing device 120 as illustrated in FIG. 2 and/or plain water as a diluent to the beverage dispensing device 120 as illustrated in FIG. 3. One of ordinary skill in the art will recognize the beverage dispensing device 120 may be any suitable beverage dispensing device known in the beverage dispensing arts, such as, for example, product and diluent valves communicating with a multi-flavor dispensing nozzle or an electric valve (e.g., a LEV®) that incorporates a product valve and a diluent valve with a dispensing nozzle in a single unit. The on-demand cooling system 5 through the first cooling chamber 13 and the second cooling chamber 14 comprising the cooling tank 54 forms a cooling tank portion of a housing 121 for the beverage dispenser 10 that supports the beverage dispensing devices 120. In incorporating the on-demand cooling system 5 therein, the beverage dispenser 10 typically includes a deck configured to sit atop the cooling tank 54 that provides a platform for components of the beverage dispenser 10 including the on-demand cooling system 5, such as, for example, the control system 11 and the refrigeration unit 19. The beverage dispenser 10 further typically includes a cover 122 configured to fit on the cooling tank 54 over the deck. The beverage dispenser 10 includes a separate control system or alternatively the control system 11 configured to operate the components of the beverage dispenser 10, such as the beverage dispensing devices 120, in delivering a formed beverage.

The on-demand cooling system 5, when incorporated into the beverage dispenser 10 as illustrated in FIG. 2, interfaces with at least one product source 123 and typically multiple product sources 123 in order to supply product syrup to the beverage dispensing device 120 for mixing with carbonated water or plain water as illustrated in FIG. 3 to produce a formed beverage. The product source 123 delivers product syrup into the cooling tank 54 using a product line 124 including a pump 125. The product line 124 enters the cooling tank 54 and connects with product tubing 126 running within the cooling tank 54 and preferably within the second cooling chamber 14 until the product tubing 126 connects with the beverage dispensing device 120. The product tubing 126 runs within the cooling tank 54 a length established to facilitate a transfer of heat energy from the product syrup within the product tubing 126 to the chilled water within the second cooling chamber 14 sufficient to reduce the temperature of the product syrup to below a desired temperature, such as, for example, 33° F./0.56° C. and 40° F./4.4° C. As an illustration, the product tubing 126 may form a coil that provides the length in a minimized footprint within the second cooling chamber 14.

The carbonator 70 as illustrated in FIG. 2 connects with a pump 127 at the water outlet 53 using a feed line 128 extending from and connecting with the carbonator 70. The pump 71 connects at an outlet 129 with carbonated water tubing 130 running within the cooling tank 54 and preferably within the second cooling chamber 14 until the carbonated water tubing 130 connects with the beverage dispensing device 120. The carbonated water tubing 130 runs within the cooling tank 54 a length established to facilitate a transfer of heat energy from the carbonated water within the carbonated water tubing 130 to the chilled water within the second cooling chamber 14 sufficient to maintain the temperature of the carbonated water below a desired temperature, such as, for example, 33° F./0.56° C. and 40° F./4.4° C. As an illustration, the carbonated water tubing 130 may form a coil that provides the length in a minimized footprint within the second cooling chamber 14. While the pump 127 is depicted as exterior to the cooling tank 54, one of ordinary skill in the art will recognize the pump 127 may be located in the cooling tank 54, preferably in the second cooling chamber 14.

When producing a formed carbonated beverage, the control system 11, responsive to the activation of a beverage dispensing device 120, activates the pump 125 to deliver product syrup into the product tubing 126 from the product source 123 via the product line 124. The product syrup entering the product tubing 126 displaces chilled product syrup within the product tubing 126 such that the product tubing 126 delivers the chilled product syrup to the beverage dispensing device 120. Similarly, the control system 11, responsive to the activation of a beverage dispensing device 120, activates the pump 127 to deliver carbonated water into the carbonated water tubing 130 from the carbonator 70 via the feed line 128. The carbonated water entering the carbonated water tubing 130 displaces chilled carbonated water within the carbonated water tubing 130 such that the carbonated water tubing 130 delivers the chilled carbonated water to the beverage dispensing device 120. The beverage dispensing device 120 receives the chilled product syrup and the chilled carbonated water therein for combining into a formed carbonated beverage dispensed from the beverage dispensing device 120.

Referring to FIG. 3, the cooling tank 54, preferably in the second cooling chamber 14, includes therein a pump 131 to deliver chilled water to the beverage dispensing device 120.

The pump 131 connects at an inlet 132 with an intake line 133 extending into the second cooling chamber 14 and at an outlet 134 with plain water tubing 135 running within the cooling tank 54 and preferably within the second cooling chamber 14 until the plain water tubing 135 connects with the beverage dispensing device 120 at the water outlet 53. The plain water tubing 135 runs within the cooling tank 54 a length established to facilitate a transfer of heat energy from the plain water within the plain water tubing 135 to the chilled water within the second cooling chamber 14 sufficient to maintain the temperature of the plain water below a desired temperature, such as, for example, 33° F./0.56° C. and 40° F./4.4° C. As an illustration, the plain water tubing 135 may form a coil that provides the length in a minimized footprint within the second cooling chamber 14. While the pump 131 is depicted as located in the cooling tank 54, one of ordinary skill in the art will recognize the pump 131 may be located exterior to the cooling tank 54.

When producing a formed plain water beverage, the control system 11, responsive to the activation of a beverage dispensing device 120, activates the pump 125 to deliver product syrup into the product tubing 126 from the product source 123 via the product line 124. The product syrup entering the product tubing 126 displaces chilled product syrup within the product tubing 126 such that the product tubing 126 delivers the chilled product syrup to the beverage dispensing device 120. Similarly, the control system 11, responsive to the activation of a beverage dispensing device 120, activates the pump 131 to deliver carbonated water into the plain water tubing 135 from the second cooling chamber 14 via the intake line 133. The plain water entering the plain water tubing 135 displaces chilled plain water within the plain water tubing 135 such that the plain water tubing 135 delivers the chilled plain water to the beverage dispensing device 120. The beverage dispensing device 120 receives the chilled product syrup and the chilled plain water therein for combining into a formed plain water beverage dispensed from the beverage dispensing device 120.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

What is claimed is:

1. An on-demand cooling system for a beverage dispenser, comprising:
- a cooling enclosure;
- a first cooling chamber;
- a second cooling chamber;
- a refrigeration system communicating with the cooling enclosure, the first cooling chamber, and the second cooling chamber;
- the cooling enclosure being configured to receive water therethrough, whereby the refrigeration system chills the water flowing through the cooling enclosure prior to the water exiting the cooling enclosure;
- the first cooling chamber being configured to receive chilled water flowing from the cooling enclosure, whereby the refrigeration system chills the water within the first cooling chamber prior to the water exiting the first cooling chamber; and
- the second cooling chamber being configured to receive chilled water flowing from the first cooling chamber, whereby the refrigeration system chills the water within the second cooling chamber, thereby providing chilled water for the beverage dispenser.

2. The on-demand cooling system for a beverage dispenser of claim 1 wherein the cooling enclosure is located within the first cooling chamber.

3. The on-demand cooling system for a beverage dispenser of claim 1, comprising a recirculation system configured to remove water from the second cooling chamber and deliver the water to the cooling enclosure, whereby the refrigeration system:
- chills the water flowing through the cooling enclosure prior to the water exiting the cooling enclosure into the first cooling chamber,
- chills the water within the first cooling chamber prior to the water exiting the first cooling chamber into the second cooling chamber, and
- chills the water within the second cooling chamber, thereby maintaining chilled water for the beverage dispenser.

4. The on-demand cooling system for a beverage dispenser of claim 3, comprising:
- a control system operatively connected with the recirculation system, the refrigeration system, and a water temperature sensor located within the second cooling chamber;
- the control system, responsive to the water temperature sensor indicating water temperature within the second cooling chamber exceeds a specified temperature, activates the recirculation system to remove water from the second cooling chamber and deliver the water to the cooling enclosure;
- the control system, responsive to the water temperature sensor indicating water temperature within the second cooling chamber exceeds a specified temperature, activates the refrigeration system whereby the refrigeration system:
  - chills the water flowing through the cooling enclosure prior to the water exiting the cooling enclosure into the first cooling chamber,
  - chills the water within the first cooling chamber prior to the water exiting the first cooling chamber into the second cooling chamber, and
  - chills the water within the second cooling chamber, thereby maintaining chilled water for the beverage dispenser;
- the control system, responsive to the water temperature sensor indicating water temperature within the second cooling chamber is below the specified temperature, deactivates the recirculation system and the refrigeration system.

5. The on-demand cooling system for a beverage dispenser of claim 3, comprising:
- a control system operatively connected with the recirculation system, the refrigeration system, a water temperature sensor located within the first cooling chamber, and a water temperature sensor located within the second cooling chamber;
- the control system, responsive to the water temperature sensor within the first cooling chamber and the water temperature sensor within the second cooling chamber indicating water temperature within the first cooling chamber and the second cooling chamber exceeds a specified temperature differential, activates the recirculation system to remove water from the second cooling chamber and deliver the water to the cooling enclosure;

the control system, responsive to the water temperature sensor within the first cooling chamber and the water temperature sensor within the second cooling chamber indicating water temperature within the first cooling chamber and the second cooling chamber exceeds a specified temperature differential, activates the refrigeration system whereby the refrigeration system:

chills the water flowing through the cooling enclosure prior to the water exiting the cooling enclosure into the first cooling chamber, chills the water within the first cooling chamber prior to the water exiting the first cooling chamber into the second cooling chamber, and chills the water within the second cooling chamber, thereby maintaining chilled water for the beverage dispenser;

the control system, responsive to the water temperature sensor within the first cooling chamber and the water temperature sensor within the second cooling chamber indicating water temperature within the first cooling chamber and the second cooling chamber is below a specified temperature differential, deactivates the recirculation system and the refrigeration system.

6. The on-demand cooling system for a beverage dispenser of claim 1, comprising:

the refrigeration system, comprising:

a first evaporator zone, a second evaporator zone, and a third evaporator zone, and a refrigeration unit configured to circulate a refrigerant through the first evaporator zone, the second evaporator zone, and the third evaporator zone;

the cooling enclosure being disposed about the first evaporator zone, whereby the first evaporator zone chills the water flowing through the cooling enclosure prior to the water exiting the cooling enclosure;

the first cooling chamber including the second evaporator zone therein, whereby the second evaporator zone chills the water within the first cooling chamber prior to the water exiting the first cooling chamber; and the second cooling chamber including the third evaporator zone therein, whereby the third evaporator zone chills the water within the second cooling chamber.

7. The on-demand cooling system for a beverage dispenser of claim 6, wherein:

the first evaporator zone communicates with the second evaporator zone;

the second evaporator zone communicates with the third evaporator zone; and the refrigeration unit being configured to deliver the refrigerant to the first evaporator zone for flow consecutively through the first evaporator zone, the second evaporator zone, and the third evaporator zone before return from the third evaporator zone to the refrigeration unit.

8. The on-demand cooling system for a beverage dispenser of claim 6, wherein the refrigeration unit is configured to deliver the refrigerant to each of the first evaporator zone, the second evaporator zone, and the third evaporator zone before return to the refrigeration unit from each of the first evaporator zone, the second evaporator zone, and the third evaporator zone.

9. The on-demand cooling system for a beverage dispenser of claim 6, wherein the cooling enclosure encases the first evaporator zone such that the water flowing through the cooling enclosure directly contacts the first evaporator zone thereby enhancing heat transfer between the water and the first evaporator zone.

10. The on-demand cooling system for a beverage dispenser of claim 6, comprising:

an evaporator coil traversing the cooling enclosure to form the first evaporator zone, the first cooling chamber to form the second evaporator zone, and the second cooling chamber to form the third evaporator zone;

the refrigeration unit communicating with the evaporator coil whereby the refrigeration unit circulates the refrigerant through the evaporator coil;

the evaporator coil chills the water flowing through the cooling enclosure prior to the water exiting the cooling enclosure into the first cooling chamber;

the evaporator coil chills the water within the first cooling chamber prior to the water exiting the first cooling chamber into the second cooling chamber; and the evaporator coil chills the water within the second cooling chamber, thereby providing chilled water for the beverage dispenser.

11. The on-demand cooling system for a beverage dispenser of claim 6, comprising:

a first evaporator coil traversing the first cooling chamber, the first evaporator coil comprising at least a first evaporator coil segment and a second evaporator coil segment, whereby the cooling enclosure encases the first evaporator coil segment therein such that the first evaporator coil segment forms the first evaporator zone within the cooling enclosure, further whereby the second evaporator coil segment forms the second evaporator zone within the first cooling chamber;

a second evaporator coil connected with the first evaporator coil, the second evaporator coil traversing the second cooling chamber, whereby the second evaporator coil forms the third evaporator zone within the second cooling chamber;

the refrigeration unit communicating with the first evaporator coil and the second evaporator coil whereby the refrigeration unit circulates the refrigerant through the first evaporator coil and the second evaporator coil;

the first evaporator coil segment chills the water flowing through the cooling enclosure prior to the water exiting the cooling enclosure into the first cooling chamber;

the second evaporator coil segment chills the water within the first cooling chamber prior to the water exiting the first cooling chamber into the second cooling chamber; and the second evaporator coil chills the water within the second cooling chamber, thereby providing chilled water for the beverage dispenser.

12. The on-demand cooling system for a beverage dispenser of claim 6, comprising:

a first evaporator coil traversing the cooling enclosure such that the first evaporator coil forms the first evaporator zone within the cooling enclosure;

a second evaporator coil connected with the first evaporator coil, the second evaporator coil traversing the first cooling chamber such that the second evaporator coil forms the second evaporator zone within the first cooling chamber;

a third evaporator coil connected with the second evaporator coil, the third evaporator coil traversing the second cooling chamber such that the third evaporator coil forms the third evaporator zone within the second cooling chamber;

the refrigeration unit communicating with the first evaporator coil, the second evaporator coil, and the third evaporator coil whereby the refrigeration unit circulates the refrigerant through the first evaporator coil, the second evaporator coil, and the third evaporator coil;

the first evaporator coil chills the water flowing through the cooling enclosure prior to the water exiting the cooling enclosure into the first cooling chamber;

the second evaporator coil chills the water within the first cooling chamber prior to the water exiting the first cooling chamber into the second cooling chamber; and the third evaporator coil chills the water within the second cooling chamber, thereby providing chilled water for the beverage dispenser.

13. The on-demand cooling system for a beverage dispenser of claim 6, comprising:

a first evaporator coil traversing the cooling enclosure such that the first evaporator coil forms the first evaporator zone within the cooling enclosure, the first evaporator coil being connected with the refrigeration unit whereby the refrigeration unit circulates the refrigerant through the first evaporator coil;

a second evaporator coil traversing the first cooling chamber such that the second evaporator coil forms the second evaporator zone within the first cooling chamber, the second evaporator coil being connected with the refrigeration unit whereby the refrigeration unit circulates the refrigerant through the second evaporator coil;

a third evaporator coil traversing the second cooling chamber such that the third evaporator coil forms the third evaporator zone within the second cooling chamber, the third evaporator coil being connected with the refrigeration unit whereby the refrigeration unit circulates the refrigerant through the third evaporator coil;

the first evaporator coil chills the water flowing through the cooling enclosure prior to the water exiting the cooling enclosure into the first cooling chamber;

the second evaporator coil chills the water within the first cooling chamber prior to the water exiting the first cooling chamber into the second cooling chamber; and the third evaporator coil chills the water within the second cooling chamber, thereby providing chilled water for the beverage dispenser.

14. The on-demand cooling system for a beverage dispenser of claim 1, comprising a cooling tank of a beverage dispenser forming the first cooling chamber and the second cooling chamber, the cooling tank including therein an interior wall that divides the cooling tank into the first cooling chamber and the second cooling chamber, whereby the interior wall includes a water transfer opening configured to deliver water chilled in the first cooling chamber to the second cooling chamber.

15. The on-demand cooling system for a beverage dispenser of claim 1, comprising:

a control system operatively connected with a water source, a lower limit water level sensor located within the second cooling chamber, and an upper limit water level sensor located within the second cooling chamber;

the control system, responsive to the lower limit water level sensor indicating a lower fill limit has been reached, initiates a delivery of water from the water source to the cooling enclosure, whereby the water flows through the cooling enclosure into the first cooling chamber and from the first cooling chamber into the second cooling chamber; and the control system, responsive to the upper limit water level sensor indicating an upper fill limit has been reached, terminates the delivery of water from the water source to the cooling enclosure.

16. The on-demand cooling system for a beverage dispenser of claim 15, comprising:

the control system operatively connected with the refrigeration system;

the control system, responsive to the lower limit water level sensor indicating a lower fill limit has been reached, activates the refrigeration system whereby the refrigeration system:

chills the water flowing through the cooling enclosure prior to the water exiting the cooling enclosure into the first cooling chamber, chills the water within the first cooling chamber prior to the water exiting the first cooling chamber into the second cooling chamber, and chills the water within the second cooling chamber, thereby providing chilled water for the beverage dispenser; and the control system, responsive to the upper limit water level sensor indicating an upper fill limit has been reached, deactivates the refrigeration system.

17. The on-demand cooling system for a beverage dispenser of claim 1, comprising:

a product line disposed within the second cooling chamber, the product line connected with a product source and with a beverage dispensing device of the beverage dispenser whereby the product line delivers product syrup to the beverage dispensing device; and a pump connected with an intake line extending into the second cooling chamber and with plain water tubing connected with the beverage dispensing device whereby the pump delivers chilled plain water within the second cooling chamber to the beverage dispensing device.

18. The on-demand cooling system for a beverage dispenser of claim 1, comprising:

a product line disposed within the second cooling chamber, the product line connected with a product source and with a beverage dispensing device of the beverage dispenser whereby the product line delivers product syrup to the beverage dispensing device; and a carbonator located within the second cooling chamber 14, the carbonator connected with a $CO_2$ gas source;

a pump connected with an intake line extending into the second cooling chamber and with a feed line connected with the carbonator whereby the pump delivers chilled plain water within the second cooling chamber to the carbonator; and a pump connected with a feed line extending from the carbonator and with carbonated water tubing connected with the beverage dispensing device whereby the pump delivers chilled carbonated water from the carbonator to the beverage dispensing device.

19. An on-demand cooling system for a beverage dispenser, comprising:

a refrigeration system, comprising:

a first evaporator zone, a second evaporator zone, and a third evaporator zone, and a refrigeration unit configured to circulate a refrigerant through the first evaporator zone, the second evaporator zone, and the third evaporator zone;

a cooling enclosure disposed about the first evaporator zone, the cooling enclosure being configured to receive water therethrough, whereby the first evaporator zone chills the water flowing through the cooling enclosure prior to the water exiting the cooling enclosure;

a first cooling chamber including the second evaporator zone therein, the first cooling chamber being configured to receive chilled water flowing from the cooling enclosure, whereby the second evaporator zone chills the water within the first cooling chamber prior to the water exiting the first cooling chamber; and a second cooling chamber including the third evaporator zone therein, the second cooling chamber being configured to receive chilled water flowing from the first cooling chamber, whereby the third evaporator zone chills the water within the second cooling chamber, thereby providing chilled water for the beverage dispenser.

20. The on-demand cooling system for a beverage dispenser of claim 19 wherein the cooling enclosure is located within the first cooling chamber.

21. The on-demand cooling system for a beverage dispenser of claim 19, comprising a recirculation system configured to remove water from the second cooling chamber and deliver the water to the cooling enclosure, whereby:

the first evaporator zone chills the water flowing through the cooling enclosure prior to the water exiting the cooling enclosure into the first cooling chamber, the second evaporator zone chills the water within the first cooling chamber prior to the water exiting the first cooling chamber into the second cooling chamber, and the third evaporator zone chills the water within the second cooling chamber, thereby maintaining chilled water for the beverage dispenser.

22. The on-demand cooling system for a beverage dispenser of claim 21, comprising:

a control system operatively connected with the recirculation system, the refrigeration unit, and a water temperature sensor located within the second cooling chamber;

the control system, responsive to the water temperature sensor indicating water temperature within the second cooling chamber exceeds a specified temperature, activates the recirculation system to remove water from the second cooling chamber and deliver the water to the cooling enclosure;

the control system, responsive to the water temperature sensor indicating water temperature within the second cooling chamber exceeds a specified temperature, activates the refrigeration unit whereby:

the first evaporator zone chills the water flowing through the cooling enclosure prior to the water exiting the cooling enclosure into the first cooling chamber, the second evaporator zone chills the water within the first cooling chamber prior to the water exiting the first cooling chamber into the second cooling chamber, and the third evaporator zone chills the water within the second cooling chamber, thereby maintaining chilled water for the beverage dispenser; and the control system, responsive to the water temperature sensor indicating water temperature within the second cooling chamber is below the specified temperature, deactivates the recirculation system and the refrigeration unit.

23. The on-demand cooling system for a beverage dispenser of claim 21, comprising:

a control system operatively connected with the recirculation system, the refrigeration unit, a water temperature sensor located within the first cooling chamber, and a water temperature sensor located within the second cooling chamber;

the control system, responsive to the water temperature sensor within the first cooling chamber and the water temperature sensor within the second cooling chamber indicating water temperature within the first cooling chamber and the second cooling chamber exceeds a specified temperature differential, activates the recirculation system to remove water from the second cooling chamber and deliver the water to the cooling enclosure;

the control system, responsive to the water temperature sensor within the first cooling chamber and the water temperature sensor within the second cooling chamber indicating water temperature within the first cooling chamber and the second cooling chamber exceeds a specified temperature differential, activates the refrigeration unit whereby:

the first evaporator zone chills the water flowing through the cooling enclosure prior to the water exiting the cooling enclosure into the first cooling chamber, the second evaporator zone chills the water within the first cooling chamber prior to the water exiting the first cooling chamber into the second cooling chamber, and the third evaporator zone chills the water within the second cooling chamber, thereby maintaining chilled water for the beverage dispenser; and the control system, responsive to the water temperature sensor within the first cooling chamber and the water temperature sensor within the second cooling chamber indicating water temperature within the first cooling chamber and the second cooling chamber is below a specified temperature differential, deactivates the recirculation system and the refrigeration unit.

24. The on-demand cooling system for a beverage dispenser of claim 19, wherein:

the first evaporator zone communicates with the second evaporator zone;

the second evaporator zone communicates with the third evaporator zone; and the refrigeration unit being configured to deliver the refrigerant to the first evaporator zone for flow consecutively through the first evaporator zone, the second evaporator zone, and the third evaporator zone before return from the third evaporator zone to the refrigeration unit.

25. The on-demand cooling system for a beverage dispenser of claim 19, wherein the refrigeration unit is configured to deliver the refrigerant to each of the first evaporator zone, the second evaporator zone, and the third evaporator zone before return to the refrigeration unit from each of the first evaporator zone, the second evaporator zone, and the third evaporator zone.

26. The on-demand cooling system for a beverage dispenser of claim 19, wherein the cooling enclosure encases the first evaporator zone such that the water flowing through the cooling enclosure directly contacts the first evaporator zone thereby enhancing heat transfer between the water and the first evaporator zone.

27. The on-demand cooling system for a beverage dispenser of claim 19, comprising:

an evaporator coil traversing the cooling enclosure to form the first evaporator zone, the first cooling chamber to form the second evaporator zone, and the second cooling chamber to form the third evaporator zone;

the refrigeration unit communicating with the evaporator coil whereby the refrigeration unit circulates the refrigerant through the evaporator coil;

the evaporator coil chills the water flowing through the cooling enclosure prior to the water exiting the cooling enclosure into the first cooling chamber;

the evaporator coil chills the water within the first cooling chamber prior to the water exiting the first cooling chamber into the second cooling chamber; and the evaporator coil chills the water within the second cooling chamber, thereby providing chilled water for the beverage dispenser.

28. The on-demand cooling system for a beverage dispenser of claim 19, comprising:

a first evaporator coil traversing the first cooling chamber, the first evaporator coil comprising at least a first evaporator coil segment and a second evaporator coil segment, whereby the cooling enclosure encases the first evaporator coil segment therein such that the first evaporator coil segment forms the first evaporator zone within the cooling enclosure, further whereby the second evaporator coil segment forms the second evaporator zone within the first cooling chamber;

a second evaporator coil connected with the first evaporator coil, the second evaporator coil traversing the second cooling chamber, whereby the second evaporator coil forms the third evaporator zone within the second cooling chamber;

the refrigeration unit communicating with the first evaporator coil and the second evaporator coil whereby the refrigeration unit circulates the refrigerant through the first evaporator coil and the second evaporator coil;

the first evaporator coil segment chills the water flowing through the cooling enclosure prior to the water exiting the cooling enclosure into the first cooling chamber;

the second evaporator coil segment chills the water within the first cooling chamber prior to the water exiting the first cooling chamber into the second cooling chamber; and the second evaporator coil chills the water within the second cooling chamber, thereby providing chilled water for the beverage dispenser.

29. The on-demand cooling system for a beverage dispenser of claim 19, comprising:

a first evaporator coil traversing the cooling enclosure such that the first evaporator coil forms the first evaporator zone within the cooling enclosure;

a second evaporator coil connected with the first evaporator coil, the second evaporator coil traversing the first cooling chamber such that the second evaporator coil forms the second evaporator zone within the first cooling chamber;

a third evaporator coil connected with the second evaporator coil, the third evaporator coil traversing the second cooling chamber such that the third evaporator coil forms the third evaporator zone within the second cooling chamber;

the refrigeration unit communicating with the first evaporator coil, the second evaporator coil, and the third evaporator coil whereby the refrigeration unit circulates the refrigerant through the first evaporator coil, the second evaporator coil, and the third evaporator coil;

the first evaporator coil chills the water flowing through the cooling enclosure prior to the water exiting the cooling enclosure into the first cooling chamber;

the second evaporator coil chills the water within the first cooling chamber prior to the water exiting the first cooling chamber into the second cooling chamber; and the third evaporator coil chills the water within the second cooling chamber, thereby providing chilled water for the beverage dispenser.

30. The on-demand cooling system for a beverage dispenser of claim 19, comprising:

a first evaporator coil traversing the cooling enclosure such that the first evaporator coil forms the first evaporator zone within the cooling enclosure, the first evaporator coil being connected with the refrigeration unit whereby the refrigeration unit circulates the refrigerant through the first evaporator coil;

a second evaporator coil traversing the first cooling chamber such that the second evaporator coil forms the second evaporator zone within the first cooling chamber, the second evaporator coil being connected with the refrigeration unit whereby the refrigeration unit circulates the refrigerant through the second evaporator coil;

a third evaporator coil traversing the second cooling chamber such that the third evaporator coil forms the third evaporator zone within the second cooling chamber, the third evaporator coil being connected with the refrigeration unit whereby the refrigeration unit circulates the refrigerant through the third evaporator coil;

the first evaporator coil chills the water flowing through the cooling enclosure prior to the water exiting the cooling enclosure into the first cooling chamber;

the second evaporator coil chills the water within the first cooling chamber prior to the water exiting the first cooling chamber into the second cooling chamber; and the third evaporator coil chills the water within the second cooling chamber, thereby providing chilled water for the beverage dispenser.

31. The on-demand cooling system for a beverage dispenser of claim 19, comprising a cooling tank of a beverage dispenser forming the first cooling chamber and the second cooling chamber, the cooling tank including therein an interior wall that divides the cooling tank into the first cooling chamber and the second cooling chamber, whereby the interior wall includes a water transfer opening configured to deliver water chilled in the first cooling chamber to the second cooling chamber.

32. The on-demand cooling system for a beverage dispenser of claim 19, comprising:

a control system operatively connected with a water source, a lower limit water level sensor located within the second cooling chamber, and an upper limit water level sensor located within the second cooling chamber;

the control system, responsive to the lower limit water level sensor indicating a lower fill limit has been reached, initiates a delivery of water from the water source to the cooling enclosure, whereby the water flows through the cooling enclosure into the first cooling chamber and from the first cooling chamber into the second cooling chamber; and the control system, responsive to the upper limit water level sensor indicating an upper fill limit has been reached, terminates the delivery of water from the water source to the cooling enclosure.

33. The on-demand cooling system for a beverage dispenser of claim 32, comprising:

the control system operatively connected with the refrigeration unit;

the control system, responsive to the lower limit water level sensor indicating a lower fill limit has been reached, activates the refrigeration unit whereby:
the first evaporator zone chills the water flowing through the cooling enclosure prior to the water exiting the cooling enclosure into the first cooling chamber,
the second evaporator zone chills the water within the first cooling chamber prior to the water exiting the first cooling chamber into the second cooling chamber, and
the third evaporator zone chills the water within the second cooling chamber, thereby providing chilled water for the beverage dispenser; and
the control system, responsive to the upper limit water level sensor indicating an upper fill limit has been reached, deactivates the refrigeration unit.

34. The on-demand cooling system for a beverage dispenser of claim 19, comprising:
a product line disposed within the second cooling chamber, the product line connected with a product source and with a beverage dispensing device of the beverage dispenser whereby the product line delivers product syrup to the beverage dispensing device; and
a pump connected with an intake line extending into the second cooling chamber and with plain water tubing connected with the beverage dispensing device whereby the pump delivers chilled plain water within the second cooling chamber to the beverage dispensing device.

35. The on-demand cooling system for a beverage dispenser of claim 19, comprising:
a product line disposed within the second cooling chamber, the product line connected with a product source and with a beverage dispensing device of the beverage dispenser whereby the product line delivers product syrup to the beverage dispensing device; and
a carbonator located within the second cooling chamber 14, the carbonator connected with a $CO_2$ gas source;
a pump connected with an intake line extending into the second cooling chamber and with a feed line connected with the carbonator whereby the pump delivers chilled plain water within the second cooling chamber to the carbonator; and
a pump connected with a feed line extending from the carbonator and with carbonated water tubing connected with the beverage dispensing device whereby the pump delivers chilled carbonated water from the carbonator to the beverage dispensing device.

36. A method of on-demand cooling in a beverage dispenser, comprising:
circulating a refrigerant through a first evaporator zone, a second evaporator zone, and a third evaporator zone;
flowing water through a cooling enclosure disposed about the first evaporator zone, whereby the first evaporator zone chills the water flowing through the cooling enclosure prior to the water exiting the cooling enclosure;
flowing water from the cooling enclosure into a first cooling chamber having the second evaporator zone therein, whereby the second evaporator zone chills the water within the first cooling chamber prior to the water exiting the first cooling chamber; and
flowing water from the first cooling chamber into a second cooling chamber having the third evaporator zone therein, whereby the third evaporator zone chills the water within the second cooling chamber, thereby providing chilled water for the beverage dispenser.

37. The method of on-demand cooling in a beverage dispenser of claim 36, wherein flowing water through a cooling enclosure comprises:
initiating a delivery of water from a water source to the cooling enclosure responsive to an indication a lower fill limit has been reached; and
terminating the delivery of water from the water source to the cooling enclosure responsive to an indication an upper fill limit has been reached.

38. The method of on-demand cooling in a beverage dispenser of claim 37, wherein flowing water through a cooling enclosure comprises:
circulating the refrigerant through the first evaporator zone, the second evaporator zone, and the third evaporator zone responsive to the indication the lower fill limit has been reached whereby the first evaporator zone chills the water flowing through the cooling enclosure, the second evaporator zone chills the water within the first cooling chamber, and the third evaporator zone chills the water within the second cooling chamber; and
terminating circulation of the refrigerant through the first evaporator zone, the second evaporator zone, and the third evaporator zone responsive to the indication the upper fill limit has been reached.

39. The method of on-demand cooling in a beverage dispenser of claim 36, wherein flowing water through a cooling enclosure comprises:
removing water from the second cooling chamber and delivering the water to the cooling enclosure responsive to an indication water temperature exceeds a specified temperature;
circulating the refrigerant through the first evaporator zone, the second evaporator zone, and the third evaporator zone responsive to the indication water temperature exceeds the specified temperature whereby the first evaporator zone chills the water flowing through the cooling enclosure, the second evaporator zone chills the water within the first cooling chamber, and the third evaporator zone chills the water within the second cooling chamber, thereby maintaining chilled water for the beverage dispenser;
terminating water removal from the second cooling chamber and water delivery to the cooling enclosure responsive to an indication water temperature is below the specified temperature; and
terminating circulation of the refrigerant through the first evaporator zone, the second evaporator zone, and the third evaporator zone responsive to the indication water temperature is below the specified temperature.

40. The method of on-demand cooling in a beverage dispenser of claim 36, wherein flowing water through a cooling enclosure comprises:
removing water from the second cooling chamber and delivering the water to the cooling enclosure responsive to an indication water temperature within the first cooling chamber and the second cooling chamber exceeds a specified temperature differential;
circulating the refrigerant through the first evaporator zone, the second evaporator zone, and the third evaporator zone responsive to the indication water temperature within the first cooling chamber and the second cooling chamber exceeds the specified temperature differential whereby the first evaporator zone chills the water flowing through the cooling enclosure, the second evaporator zone chills the water within the first cooling chamber, and the third evaporator zone chills the water within the second cooling chamber, thereby maintaining chilled water for the beverage dispenser;

terminating water removal from the second cooling chamber and water delivery to the cooling enclosure responsive to an indication water temperature within the first cooling chamber and the second cooling chamber is below the specified temperature differential; and terminating circulation of the refrigerant through the first evaporator zone, the second evaporator zone, and the third evaporator zone responsive to the indication water temperature within the first cooling chamber and the second cooling chamber is below the specified temperature differential.

* * * * *